US012352687B2

(12) United States Patent
Germer

(10) Patent No.: US 12,352,687 B2
(45) Date of Patent: Jul. 8, 2025

(54) MUELLER MATRIX ELLIPSOMETER

(71) Applicant: Government of the United States of America, as represented by the Secretary of Commerce, Gaithersburg, MD (US)

(72) Inventor: Thomas Avery Germer, Montgomery Village, MD (US)

(73) Assignee: Government of the United States of America, as represented by the Secretary of Commerce, Gaithersburg, MD (US)

( * ) Notice: Subject to any disclaimer, the term of this patent is extended or adjusted under 35 U.S.C. 154(b) by 187 days.

(21) Appl. No.: 18/218,692

(22) Filed: Jul. 6, 2023

(65) Prior Publication Data

US 2024/0011894 A1      Jan. 11, 2024

Related U.S. Application Data

(60) Provisional application No. 63/358,717, filed on Jul. 6, 2022.

(51) Int. Cl.
*G01N 21/21* (2006.01)

(52) U.S. Cl.
CPC ..... *G01N 21/211* (2013.01); *G01N 2021/214* (2013.01); *G01N 2021/215* (2013.01); *G01N 2201/126* (2013.01)

(58) Field of Classification Search
CPC ........... G01N 21/211; G01N 2021/215; G01N 2021/214; G01N 2201/126
See application file for complete search history.

(56) References Cited

U.S. PATENT DOCUMENTS

| 4,179,190 | A | | 12/1979 | Friedman et al. |
| 4,306,809 | A | | 12/1981 | Azzam |
| 5,075,893 | A | * | 12/1991 | Epstein .................. H01S 3/083 372/99 |
| 5,166,752 | A | * | 11/1992 | Spanier ................ G01N 21/211 356/369 |
| 5,963,325 | A | | 10/1999 | Johs et al. |
| 6,074,065 | A | | 6/2000 | Mayer et al. |

(Continued)

OTHER PUBLICATIONS

Compain, E., et al., "General and self-consistent method for the calibration of polarization modulators, polarimeters, and Mueller-matrix ellipsometers", Applied Optics, 1999, p. 3490-3502, vol. 38 No. 16.

(Continued)

*Primary Examiner* — Sang H Nguyen
(74) *Attorney, Agent, or Firm* — Office of Chief Counsel for National Institute of Standards and Technology

(57) ABSTRACT

Embodiments of the present invention relate to an ellipsometer that includes a combination of a plurality of reflective devices to measure a Mueller matrix reflectance of a material in the VUV and EUV region. Ellipsometer in accordance with embodiments of the present invention relate to an ellipsometer that includes a multi-mirror polarization state generator combined with a multi-mirror polarization state analyzer and a detector to realize a Mueller matrix ellipsometer. Embodiments of the present invention utilize two rotating assemblies with each assembly including multiple mirrors that combine to act as amplitude and phase retarders.

41 Claims, 10 Drawing Sheets

(56) References Cited

U.S. PATENT DOCUMENTS

| | | | |
|---|---|---|---|
| 6,084,675 A | 7/2000 | Herzinger et al. | |
| 6,137,618 A * | 10/2000 | Herzinger | G02B 5/3066 |
| | | | 359/485.02 |
| 6,356,578 B1 * | 3/2002 | Yin | G02B 5/3066 |
| | | | 372/98 |
| 6,456,376 B1 * | 9/2002 | Liphardt | G02B 27/46 |
| | | | 356/369 |
| 6,999,172 B2 | 2/2006 | Masaki et al. | |
| 7,505,133 B1 * | 3/2009 | Zawaideh | G01B 11/0641 |
| | | | 356/369 |
| 7,535,566 B1 * | 5/2009 | Johs | G01N 21/274 |
| | | | 359/359 |
| 8,462,341 B2 * | 6/2013 | He | G01J 4/00 |
| | | | 356/369 |
| 8,854,606 B2 | 10/2014 | Mann et al. | |
| 10,634,607 B1 * | 4/2020 | Hovorka | G01N 21/211 |
| 10,868,403 B2 | 12/2020 | Kawasuji | |
| 2015/0285735 A1 * | 10/2015 | Wang | G01N 21/956 |
| | | | 356/369 |
| 2016/0187248 A1 * | 6/2016 | Liu | G01B 11/24 |
| | | | 356/369 |

OTHER PUBLICATIONS

Kandaka, N., et al., "Ellipsometrical determination of the optical constants of gold in the vacuum ultraviolet region", Review of Scientific Instruments, 1992, p. 1450-1453, vol. 63.

Koide, T., et al., "Production and direct measurement of circularly polarized vacuum-ultraviolet light with multireflection optics", Applied Physics Letters, 1991, p. 2592-2594, vol. 58.

Johnson, P.D., et al., "Production of Circularly Polarized Light from Synchrotron Radiation in the Vacuum Ultraviolet Region", Nuclear Instruments and Methods, 1983, p. 505-208.

Azzam, R.M.A., "Phtotopolarimetric measurement of the Mueller matrix by Fourier analysis of a single detected signal", Optics Letters, 1978, p. 148-150, vol. 2 No. 6.

* cited by examiner

MUELLER MATRIX ELLIPSOMETER

CROSS-REFERENCE TO RELATED APPLICATION

This application claims the benefit of priority from U.S. Provisional Patent Application Ser. No. 63/358,717, filed on Jul. 6, 2022, the disclosure of which is incorporated herein by reference in its entirety.

STATEMENT REGARDING FEDERAL RIGHTS

The invention described herein was made with United States Government support from the National Institute of Standards and Technology (NIST), an agency of the United States Department of Commerce. The United States Government has certain rights in the invention.

FIELD OF THE INVENTION

The present invention relates generally to optical analyzers, and more particularly to a Mueller matrix ellipsometer.

BACKGROUND OF THE INVENTION

Spectroscopic ellipsometry is a measurement technique often used for measuring the dielectric function of materials, the thicknesses and dielectric functions of films, and/or the dimensions and dielectric functions of complex periodic structures. This technique measures the change in polarization state of optical radiation upon reflection from the sample as a function of the wavelength of the optical radiation, and dielectric functions and dimensions are inferred from the measurement data through inverse electromagnetic modeling. Spectroscopic ellipsometry can also be used to determine the dimensions and dielectric functions in a period structure, and such applications are often referred to as scatterometry or optical critical dimension metrology.

Ellipsometry requires control of the polarization of the incident radiation and analysis of the polarization of the reflected radiation. While measurements from isotropic materials and thin films only require a subspace of incident and analyzed polarization states, measurements from anisotropic materials and structures benefit from a full spanning of incident and analyzed polarization states, in what is referred to as Mueller matrix ellipsometry. Typical polarization control and/or analysis is performed using optical devices that act either as polarizers or as phase retarders. A preferred polarizer exhibits a diattenuation, such that one polarization is transmitted or reflected with little attenuation while the orthogonal polarization is attenuated. A preferred phase retarder, often referred to as a wave plate or a compensator, is a device that alters the phase of one polarization with respect to its orthogonal polarization but without changing its amplitude. These devices can be combined to perform polarization control and analysis. If a source generating unpolarized radiation is followed first by a fixed polarizer and then by a rotating phase retarder, the exiting radiation will include polarization spanning all degrees of freedom. Similarly, in reverse, complete polarization analysis of radiation can be performed by passing the radiation first through a rotating phase retarder then through a fixed polarizer before striking a detector. A complete analysis of the reflection properties of a sample (what is known as the Mueller matrix) can be achieved using a complete polarization state generator together with a complete polarization state analyzer.

Ellipsometers have been constructed for operation in the terahertz, infrared, visible, and ultraviolet spectral regions, having a minimum wavelength of about 140 nm. Extending such devices into the vacuum ultraviolet (VUV) and extreme ultraviolet (EUV) regions of the electromagnetic spectrum have been impeded because nearly all materials are opaque in these regions. Therefore, these devices will need to rely upon reflection from surfaces instead of transmission through materials. While a reasonable polarizer may be possible for this purpose, constructing an ideal phase retarder is difficult because reflection from a surface generally yields both diattenuation and retardance of the two natural polarization states with respect to each other. This difficulty increases with the need for an ideal phase retarder over a broad spectral range.

Accordingly, there is a need for an ellipsometer having polarization state analyzer and polarization state generator capable of operating in the VUV and EUV regions of the electromagnetic spectrum to determine a Mueller matrix reflectance of a material.

SUMMARY OF THE INVENTION

Embodiments of the present invention relate to an ellipsometer that includes a combination of a plurality of reflective devices to measure a Mueller matrix reflectance of a material in the VUV and EUV region. Embodiments of the present invention relate to an ellipsometer that includes a multi-mirror polarization state generator combined with a multi-mirror polarization state analyzer and a detector to realize a Mueller matrix ellipsometer.

Embodiments of the present invention also relate to an ellipsometer for investigating a sample, said ellipsometer including a radiation source for generating a non-polarized radiation beam; a polarization state generator including a first polarizer comprising a first plurality of mirrors positioned to modify the non-polarized radiation beam to a first polarized radiation beam, wherein an optical axis of the first polarized radiation beam is substantially aligned with an optical axis of the non-polarized radiation beam; and a first rotating compensator comprising a second plurality of mirrors for altering the first polarized radiation beam to a second polarized radiation beam having a first phase retardance, wherein an optical axis of the second polarized radiation beam is substantially aligned with the optical axis of the first polarized radiation beam; a sample holder for positioning a first surface of the sample to receive the second polarized radiation beam from the first rotating compensator, wherein the first surface of the sample reflects a third polarized radiation beam; a polarization state analyzer including a second rotating compensator comprising a third plurality of mirrors for altering the third polarized radiation beam to a fourth polarized radiation beam having a second phase retardance, wherein an optical axis of the fourth polarized radiation beam is substantially aligned with the optical axis of the third polarized radiation beam; and a second polarizer comprising a fourth plurality of mirrors for modifying the fourth polarized radiation beam to a fifth polarized radiation beam, wherein an optical axis of the fifth polarized radiation beam is substantially aligned with an optical axis of the fourth polarized radiation beam; a detector for measuring a plurality of first signals for a plurality of first rotation angles of the first rotating compensator and a plurality of second signals for a plurality of second rotation angles of the second rotating compensator; and a processor for determining a Mueller matrix from the plurality of the first rotation angles of the first rotating compensator and the plurality of the second rotation angles of the second rotating compensator. More particularly, at least one of the first polarizer, the second polarizer, the first compensator and the second compensator include three mirrors.

In one embodiment, the non-polarized radiation beam has a wavelength in vacuum ultraviolet region of an electromagnetic spectrum. In another embodiment, the non-polarized radiation beam has a wavelength in extreme ultraviolet region of an electromagnetic spectrum.

In one aspect of the present invention, the first plurality of mirrors includes: a first mirror positioned to reflect the non-polarized radiation beam incident on the first mirror as a first reflected radiation beam; a second mirror positioned to reflect the first reflected radiation beam incident on the second mirror as a second reflected radiation beam; and a third mirror positioned to reflect the second reflected radiation beam incident on the third mirror as the first polarized radiation beam; the second plurality of mirrors include: a fourth mirror positioned to reflect the first polarized radiation beam incident on the fourth mirror as a third reflected radiation beam; a fifth mirror positioned to reflect the third reflected radiation beam incident on the fifth mirror as a fourth reflected radiation beam; and a sixth mirror positioned to reflect the fourth reflected radiation beam incident on the sixth mirror as the second polarized radiation beam having the first phase retardance; the third plurality of mirrors includes: a seventh mirror positioned to reflect the third polarized radiation beam incident on the seventh mirror as fifth reflected radiation beam; an eighth mirror positioned to reflect the fifth reflected radiation beam incident on the eighth mirror as a sixth reflected radiation beam; and a ninth mirror positioned to reflect the sixth reflected radiation beam incident on the ninth mirror as the fourth polarized radiation beam having the second phase retardance; and the fourth plurality of mirrors includes: a tenth mirror positioned to reflect the fourth polarized radiation beam incident on the tenth mirror as a seventh reflected radiation beam; an eleventh mirror positioned to reflect the seventh reflected radiation beam incident on the eleventh mirror as an eighth reflected radiation beam; and a twelfth mirror positioned to reflect the eighth reflected radiation beam incident on the twelfth mirror as the fourth polarized radiation beam.

In one embodiment of the present invention, the first plurality of mirrors further includes a thirteenth mirror positioned to receive one of the non-polarized radiation beam, the first reflected radiation beam and the second reflected radiation beam, wherein the first, the second, the third and the thirteenth mirrors modify the non-polarized radiation beam to the first polarized radiation beam. In a second embodiment of the present invention, the second plurality of mirrors further comprises a fourteenth mirror positioned to receive one of the first polarized radiation beam, the third reflected radiation beam and the fourth reflected radiation beam, wherein the fourth, the fifth, the sixth and the fourteenth mirrors alter the first polarized radiation beam to the second polarized radiation beam having the first phase retardance. In a third embodiment of the present invention, the third plurality of mirrors further comprises a fourteenth mirror positioned to receive one of the third polarized radiation beam, the fifth reflected radiation beam and the sixth reflected radiation beam, wherein the seventh, the eighth, the ninth and the fourteenth mirrors alter the third polarized radiation beam to the fourth polarized radiation beam having the second phase retardance. In a fourth embodiment of the present invention, the fourth plurality of mirrors further comprises a fourteenth mirror positioned to receive one of the fourth polarized radiation beam, the seventh reflected radiation beam and the eighth reflected radiation beam, wherein the tenth, the eleventh, the twelfth and the fourteenth mirrors modify the fourth polarized radiation beam to the fifth polarized radiation beam.

In one aspect of the present invention, the first rotating compensator is rotated about an axis substantially aligned with the optical axes of the first and the second polarized radiation beams, and wherein the second compensator is rotated about an axis substantially aligned with the optical axes of the third and the fourth polarized radiation beams.

In some aspects of the present invention, the polarization state analyzer is rotated about an axis passing through a location the second polarized radiation beam is received on the first surface of the sample positioned on the sample holder, wherein the sample holder rotates the sample about the axis passing through the location the second polarized radiation beam is received on the first surface of the sample positioned on the sample holder, wherein the rotation of the sample is about one-half of the rotation of the polarization state analyzer, and wherein the rotating the polarization state analyzer adjusts an angle of incidence of the second polarized radiation beam on the first surface of the sample positioned on the sample holder and an angle of reflection of the third polarized radiation beam. In other aspects of the present invention, the sample holder rotates the sample in an azimuthal direction about an axis normal to the first surface of the sample.

Embodiments of the present invention also relate to an ellipsometer for investigating a sample, said ellipsometer including a radiation source for generating a non-polarized radiation beam having a wavelength from about 10 nm to about 240 nm; a first polarizer for modifying the non-polarized radiation beam to a first polarized radiation beam, wherein an optical axis of the first polarized radiation beam is substantially aligned with an optical axis of the non-polarized radiation beam, wherein the first polarizer includes: a first mirror positioned to reflect the non-polarized radiation beam incident on the first mirror as a first reflected radiation beam; a second mirror positioned to reflect the first reflected radiation beam incident on the second mirror as a second reflected radiation beam; and a third mirror positioned to reflect the second reflected radiation beam incident on the third mirror as the first polarized radiation beam; a first rotating compensator for altering the first polarized radiation beam to a second polarized radiation beam having a first phase retardance, wherein an optical axis of the second polarized radiation beam is substantially aligned with the optical axis of the first polarized radiation beam, wherein the first compensator is rotated about an axis substantially aligned with the optical axes of the first and the second polarized radiation beams, wherein the first rotating compensator includes: a fourth mirror positioned to reflect the first polarized radiation beam incident on the fourth mirror as a third reflected radiation beam, wherein the third reflected radiation beam comprises a second phase retardance; a fifth mirror positioned to reflect the third reflected radiation beam incident on the fifth mirror as a fourth reflected radiation beam, wherein the fourth reflected radiation beam comprises a third phase retardance; and a sixth mirror positioned to reflect the fourth reflected radiation beam incident on the sixth mirror as the second polarized radiation beam having the first phase retardance; a sample holder for positioning a first surface of the sample to receive the second polarized radiation beam from the first rotating compensator, wherein the first surface of the sample reflects a third polarized radiation beam; a second rotating compensator for altering the third polarized radiation beam to a fourth polarized radiation beam having a fourth phase retardance, wherein an optical axis of the fourth polarized radiation beam is substantially aligned with the optical axis of the third polarized radiation beam, wherein the second compensator is rotated about an axis substantially aligned with the optical axes of the third and the fourth polarized radiation beams, wherein the second compensator includes: a seventh mirror positioned to reflect the third polarized radiation beam incident on the seventh mirror as a fifth reflected radiation beam, wherein the fifth reflected radiation beam comprises a fifth phase retardance; an eighth mirror positioned to reflect the fifth reflected radiation beam incident on the eighth mirror as a sixth reflected radiation beam, wherein the sixth reflected beam comprises a sixth phase retardance; and a ninth mirror positioned to reflect the sixth reflected radiation beam incident on the ninth mirror as the fourth polarized radiation beam having the fourth phase retardance; a second polarizer for modifying the fourth polarized radiation beam to a fifth polarized radiation beam, wherein an optical axis of the fifth polarized radiation beam is substantially aligned with an optical axis of the fourth polarized radiation beam, wherein the second polarizer includes: a tenth mirror positioned to reflect the fourth polarized radiation beam incident on the tenth mirror as a seventh reflected radiation beam; an eleventh mirror positioned to reflect the seventh reflected radiation beam incident on the eleventh mirror as an eighth reflected radiation beam; and a twelfth mirror positioned to reflect the eighth reflected radiation beam incident on the twelfth mirror as the fifth polarized radiation beam; a detector for measuring a plurality of first signals for a plurality of first rotation angles of the first rotating compensator and a plurality of second signals for a plurality of second rotation angles of the second rotating compensator; and a processor for determining a Mueller matrix from the plurality of the first rotation angles of the first rotating compensator and the plurality of the second rotation angles of the second rotating compensator.

In one embodiment of the present invention, the first polarizer further comprises a thirteenth mirror positioned to receive one of the non-polarized radiation beam, the first reflected radiation beam and the second reflected radiation beam, and wherein the first, the second, the third and the thirteenth mirrors are positioned to modify the non-polarized radiation beam to the first polarized radiation beam. In another embodiment of the present invention, the second polarizer further comprises a thirteenth mirror positioned to receive one of the fourth polarized radiation beam, the seventh reflected radiation beam and the eighth reflected radiation beam, and wherein the tenth, the eleventh, the twelfth and the thirteenth mirrors are positioned to modify the fourth polarized radiation beam to the fifth polarized radiation beam. In yet another embodiment of the present invention, the first polarizer further comprises a thirteenth mirror positioned to receive a ninth reflected radiation beam from the third mirror, and wherein the thirteenth mirror is positioned to reflect the ninth reflected radiation beam incident on the thirteenth mirror as the first polarized radiation beam, and wherein the second polarizer further comprises a fourteenth mirror positioned to receive a tenth reflected radiation beam from the twelfth mirror, and wherein the fourteenth mirror is positioned to reflect the tenth reflected radiation beam incident on the fourteenth mirror as the fifth polarized radiation beam.

Another embodiment of the present invention relates to an ellipsometer for investigating a sample, said ellipsometer including a radiation source for generating a non-polarized radiation beam; a polarization state generator for modifying the non-polarized radiation beam to a first polarized radiation beam having a first phase retardance, wherein the polarization state generator includes: a first mirror positioned to reflect the non-polarized radiation beam incident on the first mirror as a first reflected radiation beam; a second mirror positioned to reflect the first reflected radiation beam incident on the second mirror as a second reflected radiation beam; a third mirror positioned to reflect the second reflected radiation beam incident on the second mirror as a third reflected radiation beam; a fourth mirror positioned to reflect the third reflected radiation beam incident on the third mirror as a fourth reflected radiation beam; and a first rotating compensator for altering the fourth reflected radiation beam to the first polarized radiation beam having the first phase retardance, wherein an optical axis of the first polarized radiation beam is substantially aligned with the optical axis of the non-polarized radiation beam, wherein the first compensator is rotated about an axis substantially aligned with the optical axis of the first polarized radiation beam; a sample holder for positioning a first surface of the sample to receive the first polarized radiation beam from the polarization state generator, wherein the first surface of the sample reflects a second polarized radiation; a polarization analyzer including: a second rotating compensator for altering the second polarized radiation beam to a third polarized radiation beam having a second phase retardance, wherein an optical axis of the third polarized radiation beam is substantially aligned with the optical axis of the second polarized radiation beam, wherein the compensator is rotated about an axis substantially aligned with the optical axes of the second and the third polarized radiation beams; and a polarizer for modifying the third polarized radiation beam to a fourth polarized radiation beam, wherein an optical axis of the fourth polarized radiation beam is substantially aligned with an optical axis of the third polarized radiation beam; a detector for measuring a plurality of first signals for a plurality of first rotation angles of the polarization state generator and a plurality of second signals for a plurality of second rotation angles of the rotating compensator; and a processor for determining a Mueller matrix from the plurality of the first rotation angles of the polarization state generator and the plurality of the second rotation angles of the rotating compensator.

In one embodiment of the present invention, the first rotating compensator includes a fifth mirror positioned to reflect the fourth reflected radiation beam incident on the fifth mirror as a fifth reflected radiation beam, wherein the fifth reflected radiation beam comprises a third phase retardance; a sixth mirror positioned to reflect the fifth reflected radiation beam incident on the sixth mirror as a sixth reflected radiation beam, wherein the fifth reflected beam comprises a fourth phase retardance; and a seventh mirror positioned to reflect the sixth reflected radiation beam incident on the seventh mirror as the first polarized radiation beam having the first phase retardance.

In one embodiment of the present invention, the second rotating compensator includes a fifth mirror positioned to reflect the second polarized radiation beam incident on the fifth mirror as a fifth reflected radiation beam, wherein the fifth reflected radiation beam comprises a third phase retardance; a sixth mirror positioned to reflect the fifth reflected radiation beam incident on the sixth mirror as a sixth reflected radiation beam, wherein the sixth reflected beam comprises a fourth phase retardance; and a seventh mirror positioned to reflect the sixth reflected radiation beam incident on the seventh mirror as the third polarized radiation beam having the second phase retardance.

In one embodiment of the present invention, the polarizer includes a fifth mirror positioned to reflect the third polarized radiation beam incident on the fifth mirror as a fifth reflected radiation beam; a sixth mirror positioned to reflect the fifth reflected radiation beam incident on the sixth mirror as a sixth reflected radiation beam; and a seventh mirror positioned to reflect the sixth reflected radiation beam incident on the seventh mirror as the fourth polarized radiation beam. In another embodiment of the present invention, the polarizer includes a fifth mirror positioned to reflect the third polarized radiation beam incident on the fifth mirror as a fifth reflected radiation beam; a sixth mirror positioned to reflect the fifth reflected radiation beam incident on the sixth mirror as a sixth reflected radiation beam; and a seventh mirror positioned to reflect the sixth reflected radiation beam incident on the seventh mirror as a seventh reflected radiation beam; and an eighth mirror positioned to receive the seventh reflected radiation beam incident on the eighth mirror as the fourth polarized radiation beam.

Embodiments of the present invention also relate to an ellipsometer for investigating a sample, said ellipsometer including a radiation source for generating a non-polarized radiation beam; a polarization state generator including: a first Brewster mirror for modifying the non-polarized radiation beam to a first polarized radiation beam, wherein the first polarized radiation beam comprises a first parallel optical component and a first orthogonal optical component; a first rotating compensator comprising a first plurality of mirrors for altering the first polarized radiation beam to a second polarized radiation beam having a first phase retardance, wherein an optical axis of the second polarized radiation beam is substantially aligned with an optical axis of the first polarized radiation beam, wherein the first rotating compensator is rotated about an axis substantially aligned with the optical axes of the first and the second polarized radiation beams; a sample holder for positioning a first surface of the sample to receive the second polarized radiation beam from the first rotating compensator, wherein the first surface of the sample reflects a third polarized radiation beam; a polarization analyzer including: a second rotating compensator comprising a second plurality of mirrors for altering the third polarized radiation beam to a fourth polarized radiation beam having a second phase retardance, wherein an optical axis of the fourth polarized radiation beam is substantially aligned with an optical axis of the third polarized radiation beam, wherein the second compensator is rotated about an axis substantially aligned with the optical axes of the third and the fourth polarized radiation beams; and a second Brewster mirror for modifying the fourth polarized radiation beam to a fifth polarized radiation beam, wherein the fifth polarized radiation beam comprises a second parallel optical component and a second orthogonal optical component, wherein an optical axis of the fifth polarized radiation beam is substantially aligned with the optical axis of the fourth polarized radiation beam, wherein the polarization state analyzer is rotated about an axis passing through a location the second polarized radiation beam is received on the first surface of the sample positioned on the sample holder, wherein the sample holder rotates the sample about the axis passing through the location the second polarized radiation beam is received on the first surface of the sample positioned on the sample holder, wherein the rotation of the sample is about one-half of the rotation of the polarization state analyzer, and wherein the rotating the polarization state analyzer adjusts an angle of incidence of the second polarized radiation beam on the first surface of the sample positioned on the sample holder and an angle of reflection of the third polarized radiation beam; a detector for measuring a plurality of first signals for a plurality of first rotation angles of the first rotating compensator and a plurality of second signals for a plurality of second rotation angles of the second rotating compensator; and a processor for determining a Mueller matrix from the plurality of the first rotation angles of the first rotating compensator and the plurality of the second rotation angles of the second rotating compensator.

In some embodiments of the present invention, the first plurality of mirrors includes a first mirror positioned to reflect the non-polarized radiation beam incident on the first mirror as a first reflected radiation beam; a second mirror positioned to reflect the first reflected radiation beam incident on the second mirror as a second reflected radiation beam; and a third mirror positioned to reflect the second reflected radiation beam incident on the third mirror as the first polarized radiation beam having the first phase retardance. In other embodiments of the present invention, the second plurality of mirrors includes a fourth mirror positioned to reflect the first polarized radiation beam incident on the fourth mirror as a third reflected radiation beam; a fifth mirror positioned to reflect the third reflected radiation beam incident on the fifth mirror as a fourth reflected radiation beam; and a sixth mirror positioned to reflect the fourth reflected radiation beam incident on the sixth mirror as the second polarized radiation beam having the second phase retardance.

Another embodiment of the present invention relates to an ellipsometer for investigating a sample, said ellipsometer including a radiation source for generating a first polarized radiation beam having a wavelength from about 10 nm to about 240 nm in an electromagnetic spectrum; a first rotating compensator for altering the first polarized radiation beam to a second polarized radiation beam, wherein an optical axis of the second polarized radiation beam is substantially aligned with the optical axis of the first polarized radiation beam, wherein the first compensator is rotated about an axis substantially aligned with the optical axes of the first and the second polarized radiation beams, wherein the first rotating compensator comprises: a first mirror positioned to reflect the first polarized radiation beam incident on the first mirror as a first reflected radiation beam, wherein the first reflected radiation beam comprises a first phase retardance; a second mirror positioned to reflect the first reflected radiation beam incident on the second mirror as a second reflected radiation beam, wherein the second reflected radiation beam comprises a second phase retardance; and a third mirror positioned to reflect the second reflected radiation beam incident on the sixth mirror as the second polarized radiation beam having a third phase retardance; a sample holder for positioning a first surface of the sample to receive the second polarized radiation beam from the first rotating compensator, wherein the first surface of the sample reflects a third polarized radiation beam; a second rotating compensator for altering the third polarized radiation beam to a fourth polarized radiation beam, wherein an optical axis of the fourth polarized radiation beam is substantially aligned with the optical axis of the third polarized radiation beam, wherein the second compensator is rotated about an axis substantially aligned with the optical axes of the third and the fourth polarized radiation beams, wherein the second compensator includes: a fourth mirror positioned to reflect the third polarized radiation beam incident on the fourth mirror as a third reflected radiation beam, wherein the third reflected radiation beam comprises a fourth phase retardance; a fifth mirror positioned to reflect the third reflected radiation beam incident on the fifth mirror as a fourth reflected radiation beam, wherein the fourth reflected beam comprises a fifth phase retardance; and a sixth mirror positioned to reflect the fourth reflected radiation beam incident on the sixth mirror as the fourth polarized radiation beam having a sixth phase retardance; a polarizer for modifying the fourth polarized radiation beam to a fifth polarized radiation beam, wherein an optical axis of the fifth polarized radiation beam is substantially aligned with an optical axis of the fourth polarized radiation beam, wherein the second polarizer includes: a seventh mirror positioned to reflect the fourth polarized radiation beam incident on the seventh mirror as a fifth reflected radiation beam; an eighth mirror positioned to reflect the fifth reflected radiation beam incident on the eighth mirror as a sixth reflected radiation beam; and a ninth mirror positioned to reflect the sixth reflected radiation beam incident on the ninth mirror as the fifth polarized radiation beam; a detector for measuring a plurality of first signals for a plurality of first rotation angles of the first rotating compensator and a plurality of second signals for a plurality of second rotation angles of the second rotating compensator; and a processor for determining a Mueller matrix from the plurality of the first rotation angles of the first rotating compensator and the plurality of the second rotation angles of the second rotating compensator. In some embodiments of the present invention, the polarizer further comprises a tenth mirror positioned to receive a seventh reflected radiation beam from the ninth mirror, and wherein the tenth mirror is positioned to reflect the seventh reflected radiation beam incident on the tenth mirror as the fifth polarized radiation beam.

In one embodiment of the present invention, the wavelength of the non-polarized radiation beam is from about 10 nm to about 30 nm. In another embodiment of the present invention, the wavelength of the non-polarized radiation beam is from about 30 nm to about 240 nm.

DETAILED DESCRIPTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention. Reference will be made to the drawings wherein like numerals refer to like elements throughout.

Figure 1:
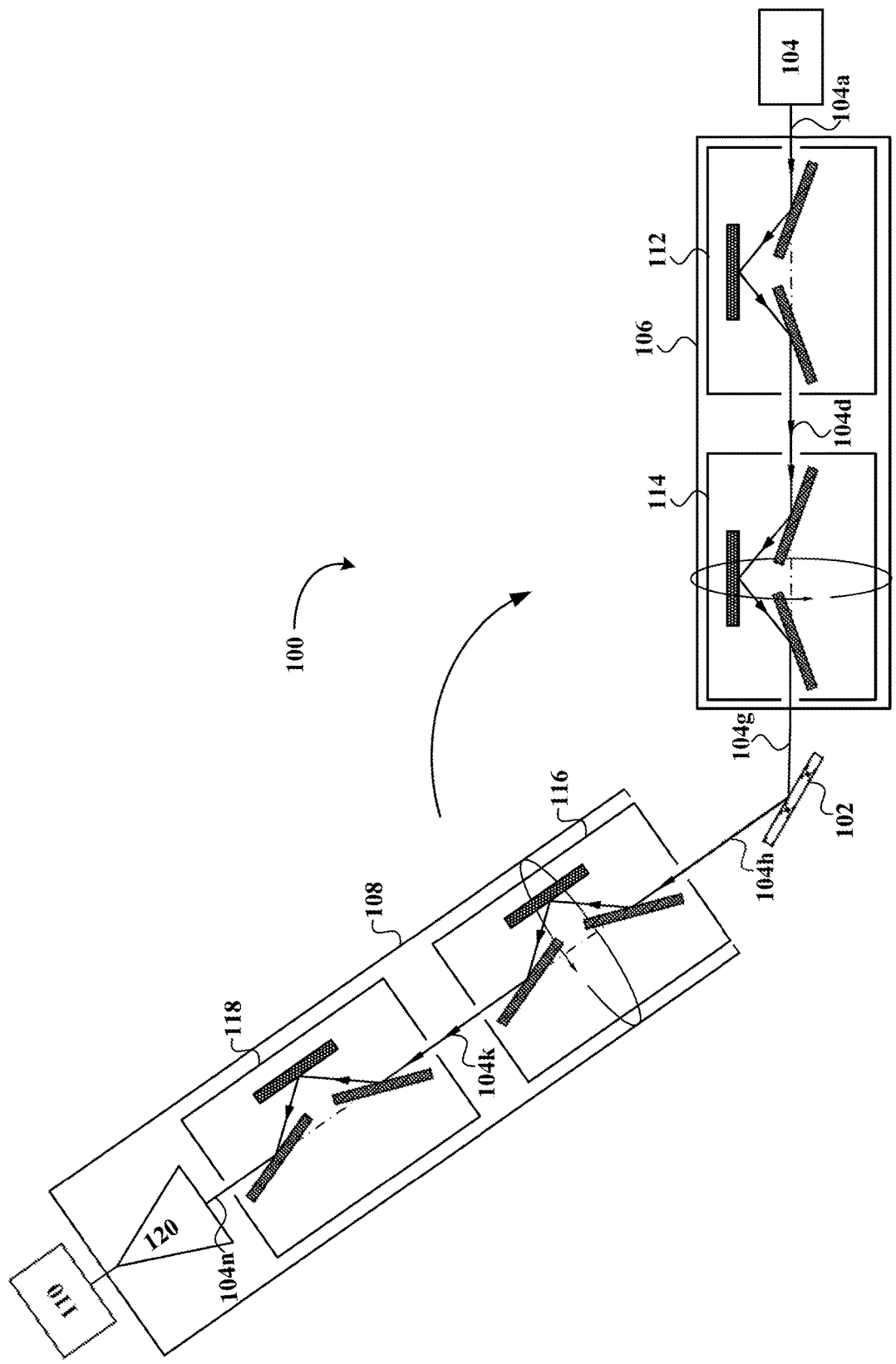
FIG. 1 illustrates a schematic representation of an ellipsometer in accordance with embodiments of the present invention.

Referring now to the drawings, and more particularly, to FIG. 1, there is shown an ellipsometer, generally designated 100 and schematically showing an embodiment of the present invention, for measuring a Mueller matrix reflectance of a material in the VUV and EUV region. Ellipsometer 100 for probing a sample artifact includes a sample holder 102, a radiation source 104, a polarization generator 106, a polarization state analyzer 108, and a processor 110.

Radiation source 104 emits a radiation beam 104a having divergent rays that are isotropically non-polarized and having a predetermined wavelength range of interest in the vacuum or extreme ultraviolet region of the electromagnetic spectrum. In some embodiments of the present invention, radiation source 104 emits a radiation beam 104a having divergent rays that are naturally polarized and having a predetermined wavelength range of interest in the vacuum or extreme ultraviolet region of the electromagnetic spectrum. In one embodiment of the present invention, radiation source 104 emits radiation beam 104a in the vacuum ultraviolet region over a predetermined wavelength range of from about 30 nm to about 240 nm. In another embodiment of the present invention, radiation source 104 emits radiation beam 104a in the extreme ultraviolet region over a predetermined wavelength range of from about 10 nm to about 30 nm.

Figure 2:
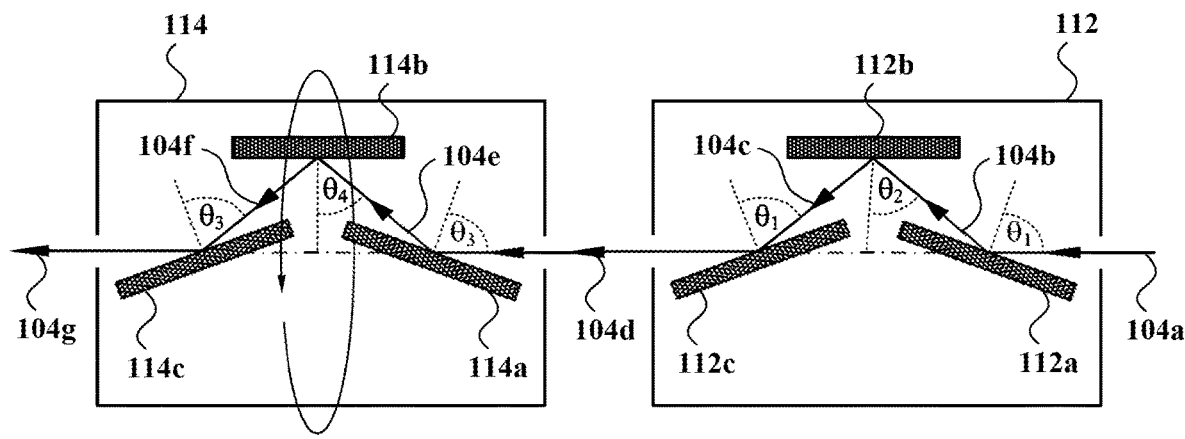
FIG. 2 illustrates a schematic representation of a polarization state generator as used in an ellipsometer in accordance with embodiments of the present invention.

Radiation beam 104a from radiation source 104 is transmitted to polarization state generator 106, which imparts a known polarization state to radiation beam 104a. Polarization state generator 106 includes a polarizer 112 and a rotating compensator 114. In one embodiment of the present invention, polarizer 112 includes mirrors 112a, 112b, and 112c, as shown in FIG. 2, positioned to receive radiation beam 104a from radiation source 104 and change non-polarized radiation beam 104a into linearly polarized radiation beam 104d by diattenuation of non-polarized radiation beam 104a. Diattenuation of non-polarized radiation beam 104a is performed by taking advantage of a difference in reflectance between s-polarized radiation beam and p-polarized radiation beam and splitting the polarized light into two mutually orthogonal components that are attenuated at different rates. Mirrors 112a-c can be made from silicon, gold, platinum, and the like. Ellipsometer 100 operating at the shorter wavelengths, such as from about 10 nm to about 30 nm, may include mirrors 112a-c having multilayer stacks applied to optimize the reflectance and phase change. Mirrors 112a-c are rigidly arranged in a housing such that the optical axis of incoming radiation beam 104a received by polarizer 112 aligns with the optical axis of radiation beam 104d exiting polarizer 112. Mirror 112a is configured such that radiation beam 104a is incident upon mirror 112a at an incident angle $\theta_1$. Mirror 112a is configured to reflect incident radiation beam 104a such that radiation beam 104b reflected from mirror 112a is incident upon mirror 112b at an incident angle $\theta_2=2\theta_1-90°$. Mirror 112b is configured to reflect incident radiation beam 104b such that radiation beam 104c reflected from mirror 112b is incident on mirror 112c at the incident angle $\theta_1$. In one embodiment of the present invention, $\theta_1$ is about 80 deg. and $\theta_2$ is about 70 deg. Mirror 112c is configured to reflect incident radiation beam 104c such that radiation beam 104d reflected from mirror 112c exits polarizer 112 as radiation beam 104d along an optical axis that aligns with the optical axis of radiation beam 104a.

Figure 3:
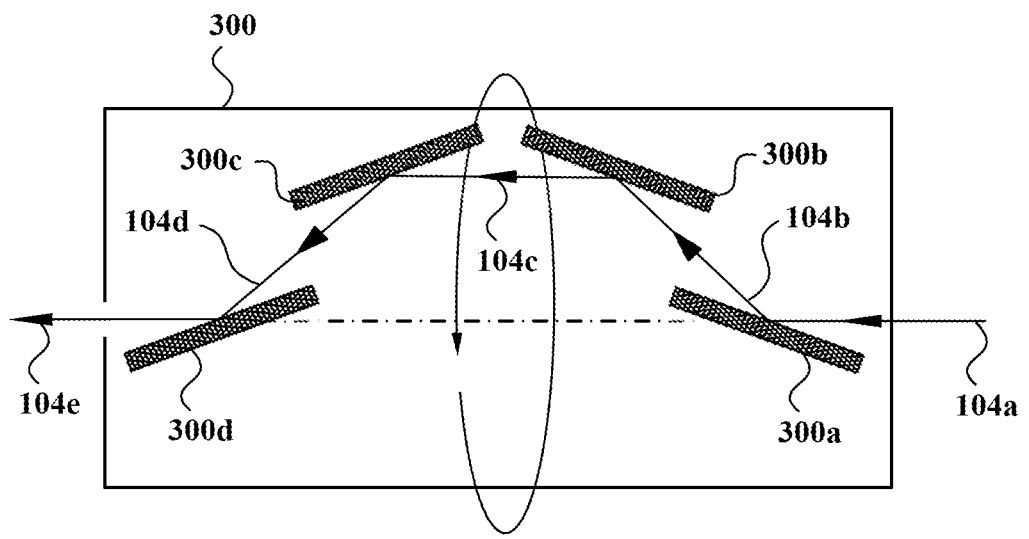
FIG. 3 illustrates a schematic representation of an alternate polarizer or compensator as used in a polarization state generator of an ellipsometer in accordance with embodiments of the present invention.

Any number of mirrors can be used in polarizer 112 such that the optical axis of an incoming radiation beam and that of an outgoing radiation beam are aligned and unchanged. FIG. 3 illustrates an alternate polarizer 300 as used in an ellipsometer in accordance with an embodiment of the present invention. Polarizer 300 includes mirrors 300a, 300b, 300c, and 300d positioned to receive radiation beam 104a from radiation source 104 and change non-polarized radiation beam 104a into linearly polarized radiation beam 104e by taking advantage of a difference in reflectance and phase between s-polarized radiation beam and p-polarized radiation beam. Mirrors 300a-d are rigidly arranged in a housing such that the optical axis of incoming radiation beam 104a received by polarizer 300 aligns with the optical axis of radiation beam 104e exiting polarizer 300. Mirror 300a is configured such that radiation beam 104a is incident upon mirror 300a at an incident angle $\theta_1$. Mirror 300a is configured to reflect incident radiation beam 104a such that radiation beam 104b reflected from mirror 300a is incident upon mirror 300b. Mirror 300b is configured to reflect incident radiation beam 104b such that radiation beam 104c reflected from mirror 300b is incident on mirror 300c. Mirror 300c is configured to reflect incident radiation beam 104c such that radiation beam 104d reflected from mirror 300c is incident on mirror 300d. Mirror 300d is configured to reflect incident radiation beam 104d such that radiation beam 104e reflected from mirror 300c exits polarizer 300 as radiation beam 104e along an optical axis that aligns with the optical axis of radiation beam 104a.

Referring back to FIGS. 1 and 2, compensator 114 receives radiation beam 104d exiting polarizer 112. Compensator 114 includes mirrors 114a, 114b, and 114c, as shown in FIG. 2, positioned to receive radiation beam 104d exiting polarizer 112 and introduces a relative phase delay (phase retardation) between a pair of mutually orthogonal polarized optical beam components of radiation beam 104d. Mirrors 114a-c can be made from silicon, gold, platinum, and the like. Ellipsometer 100 operating at the shorter wavelengths, such as from about 10 nm to about 30 nm, may include mirrors 114a-c having multilayer stacks applied to optimize the reflectance and phase change. Mirrors 114a-c are rigidly arranged in a housing such that the optical axis of incoming radiation beam 104d received from polarizer 112 aligns with the optical axis of radiation beam 104g exiting compensator 114. Mirror 114a is configured such that radiation beam 104d is incident upon mirror 114a at an incident angle $\theta_3$. Mirror 114a is configured to reflect incident radiation beam 104d such that radiation beam 104e reflected from mirror 114a is incident upon mirror 114b at an incident angle $\theta_4=2\theta_3-90°$. Mirror 114b is configured to reflect incident radiation beam 104e such that radiation beam 104f reflected from mirror 114b is incident on mirror 114c at the incident angle $\theta_3$. In some embodiments of the present invention, the incident angles $\theta_3$ and $\theta_4$ for mirrors 114a-c are grazing angles. In an exemplary embodiment of the present invention, $\theta_1$ is from about 75 deg. to about 85 deg., and $\theta_2$ is from about 60 deg. to about 80 deg. Mirror 114c is configured to reflect incident radiation beam 104f such that radiation beam 104g reflected from mirror 114c exits compensator 114 as radiation beam 104g along an optical axis that aligns with the optical axes of radiation beams 104a and 104d. Any number of mirrors can be used in compensator 114 such that the optical axis of an incoming radiation beam and that of an outgoing radiation beam are aligned and unchanged. In an alternate embodiment of the present invention, compensator 114 includes four mirrors arranged in a manner as shown in FIG. 3. A drive mechanism (not shown) can be used to rotate compensator 114 about an axis that substantially aligns with the optical axes of radiation beams 104a, 104d and 104g. As compensator 114 rotates, the polarization state of radiation beam 104g modulates along all three degrees of freedom necessary to act as a complete polarization state generator.

Radiation beam 104g exiting compensator 114 is directed to sample artifact positioned on sample holder 102, as shown in FIG. 1. Sample holder 102 is positioned such that radiation beam 104g exiting compensator 114 is incident on a surface of sample artifact. Sample holder 102 can be rotated such that radiation beam 104g is incident on a front face of the sample artifact at a predetermined incident angle. In one embodiment, sample holder 102 can be rotated azimuthally about its surface normal. Radiation beam 104g incident on the front face of a sample artifact is reflected as radiation beam 104h into polarization state analyzer 108.

Figure 4:
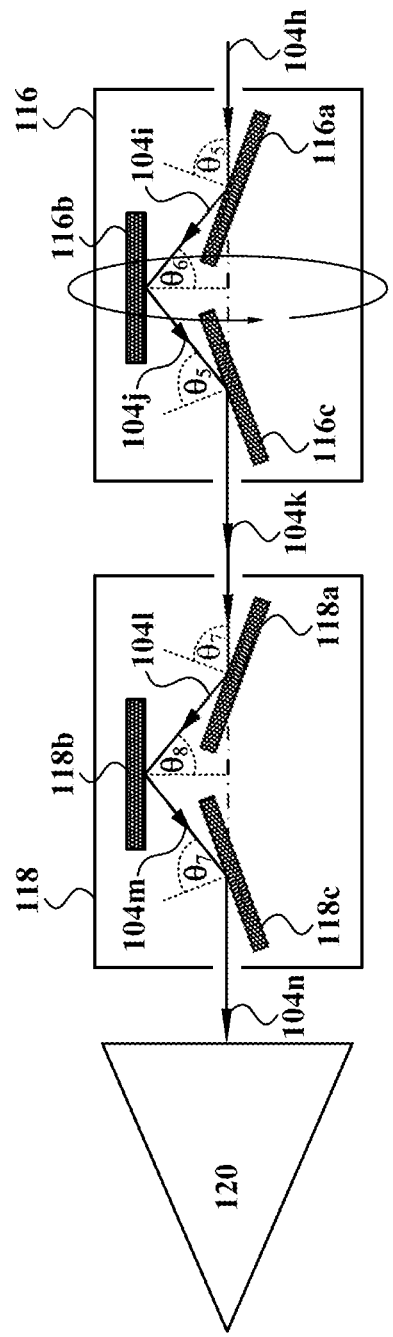
FIG. 4 illustrates a schematic representation of a polarization state analyzer as used in an ellipsometer in accordance with embodiments of the present invention.
Figure 5:
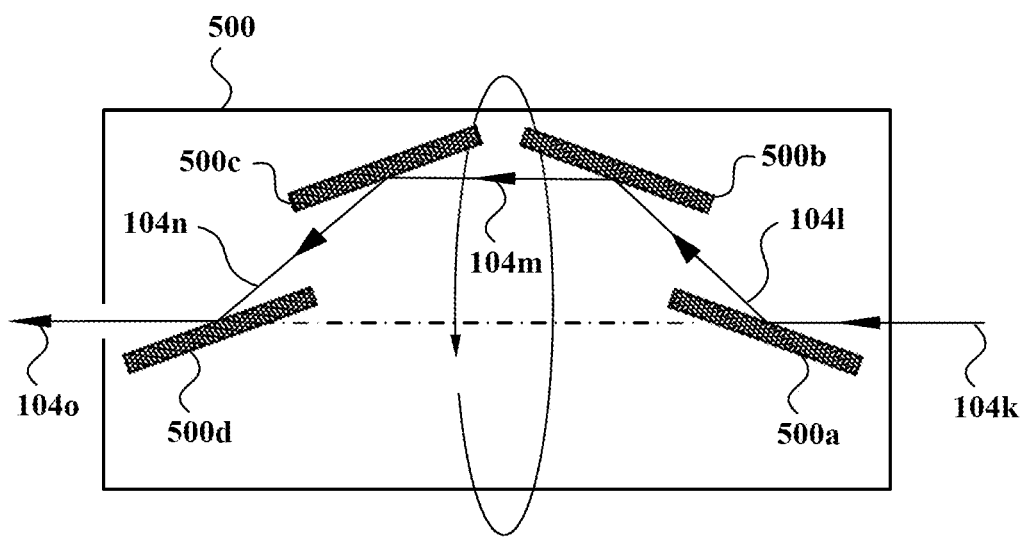
FIG. 5 illustrates a schematic representation of an alternate polarizer or compensator as used in a polarization state analyzer of an ellipsometer in accordance with embodiments of the present invention.

Polarization state analyzer 108 includes a compensator 116, a polarizer 118 and a detector 120, as shown in FIGS. 1 and 4. Polarization state analyzer 108 rotates about an axis passing through the location where radiation beam 114g strikes the front surface of the sample artifact positioned on sample holder 102 such that the angle of incidence of radiation beam 104g on a front face of the sample artifact varies with the rotation of polarization state analyzer 108. In one embodiment, sample holder 102 is rotated about an axis that aligns with the axis polarization state analyzer 108 rotates about the front surface of the sample artifact positioned on sample holder 102 and sample holder 102 is rotated about half as fast as polarization state analyzer 108. In another embodiment, sample holder 102 is rotated in an azimuthal direction about its surface normal. In some embodiments, sample holder 102 is tilted about an axis parallel to its surface. Compensator 116 includes mirrors 116a, 116b, and 116c, as shown in FIG. 4, positioned to receive radiation beam 104h reflected from the front surface of a sample artifact positioned on sample holder 102 and introduces a relative phase delay between a pair of mutually orthogonal polarized optical beam components of radiation beam 104i. Mirrors 116a-c can be made from silicon, gold, platinum, and the like. Ellipsometer 100 operating at the shorter wavelengths, such as from about 10 nm to about 30 nm, may include mirrors 116a-c having multilayer stacks applied to optimize the reflectance and phase change. Mirrors 116a-c are rigidly arranged in a housing such that the optical axis of incoming radiation beam 104h reflected from the sample artifact front surface aligns with the optical axis of radiation beam 104k exiting compensator 116. Mirror 116a is configured such that radiation beam 104h is incident upon mirror 116a at an incident angle $\theta_5$. Mirror 116a is configured to reflect incident radiation beam 104h such that radiation beam 104i reflected from mirror 116a is incident upon mirror 116*b* at an incident angle $\theta_6=2\theta_5-90°$. Mirror 116*b* is configured to reflect incident radiation beam 104*l* such that radiation beam 104*j* reflected from mirror 116*b* is incident on mirror 116*c* at the incident angle $\theta_5$. Mirror 116*c* is configured to reflect incident radiation beam 104*j* such that radiation beam 104*k* reflected from mirror 116*c* exits compensator 116 as radiation beam 104*k* along an optical axis that aligns with the optical axis of radiation beam 104*h*. Any number of mirrors can be used in compensator 116 such that the optical axis of an incoming radiation beam and that of an outgoing radiation beam are aligned and unchanged. In an alternate embodiment of the present invention, compensator 116 includes four mirrors arranged in a manner as shown in FIG. 5. Compensator 116 is capable of rotating at an angular velocity about an axis that aligns with the optical axes of radiation beams 104*h* and 104*k*. In some embodiments of the present invention, compensator 116 is capable of rotating in steps about an axis that aligns with the optical axes of radiation beams 104*h* and 104*k*.

Radiation beam 104*k* from compensator 116 is directed to polarizer 118 and polarizer 118 imparts diattenuation and phase retardance to radiation beam 104*k*. In one embodiment of the present invention, polarizer 118 includes mirrors 118*a*, 118*b*, and 118*c*, as shown in FIG. 4, positioned to receive radiation beam 104*k* from compensator 116 to apply diattenuation and phase retardance. Mirrors 118*a-c* are rigidly arranged in a housing such that the optical axis of incoming radiation beam 104*k* received by polarizer 118 aligns with the optical axis of radiation beam 104*n* exiting polarizer 118. Mirror 118*a* is configured such that radiation beam 104*k* is incident upon mirror 118*a* at an incident angle $\theta_7$. Mirror 118*a* is configured to reflect incident radiation beam 104*k* such that radiation beam 104*l* reflected from mirror 118*a* is incident upon mirror 118*b* at an incident angle $\theta_8=2\theta_7-90°$. Mirror 118*b* is configured to reflect incident radiation beam 104*l* such that radiation beam 104*m* reflected from mirror 118*b* is incident on mirror 118*c* at the incident angle $\theta_7$. Mirror 118*c* is configured to reflect incident radiation beam 104*m* such that radiation beam 104*n* reflected from mirror 118*c* exits polarizer 118 as radiation beam 104*n* along an optical axis that aligns with the optical axes of radiation beams 104*h* and 104*k*. Mirrors 118*a-c* can be made from silicon, gold, platinum, and the like. Ellipsometer 100 operating at the shorter wavelengths, such as from about 10 nm to about 30 nm, may include mirrors 118*a-c* having multilayer stacks applied to optimize the reflectance and phase change.

Any number of mirrors can be used in polarizer 118 such that the optical axis of an incoming radiation beam and that of an outgoing radiation beam are aligned and unchanged. 5 Figure illustrates an alternate polarizer 500 as used in an ellipsometer in accordance with an embodiment of the present invention. Polarizer 500 includes mirrors 500*a*, 500*b*, 500*c*, and 500*d* positioned to receive radiation beam 104*k* from compensator 116. Mirrors 500*a-d* are rigidly arranged in a housing such that the optical axis of incoming radiation beam 104*k* received by polarizer 500 aligns with the optical axis of radiation beam 104*o* exiting polarizer 500. Mirror 500*a* is configured such that radiation beam 104*k* is incident upon mirror 500*a*. Mirror 500*a* is configured to reflect incident radiation beam 104*k* such that radiation beam 104*l* reflected from mirror 500*a* is incident upon mirror 500*b*. Mirror 500*b* is configured to reflect incident radiation beam 104*l* such that radiation beam 104*m* reflected from mirror 500*b* is incident on mirror 500*c*. Mirror 500*c* is configured to reflect incident radiation beam 104*m* such that radiation beam 104*n* reflected from mirror 500*c* is incident on mirror 500*d*. Mirror 500*d* is configured to reflect incident radiation beam 104*n* such that radiation beam 104*o* reflected from mirror 500*c* exits polarizer 500 as radiation beam 104*o* along an optical axis that aligns with the optical axis of radiation beams 104*h* and 104*k*.

Figure 6:
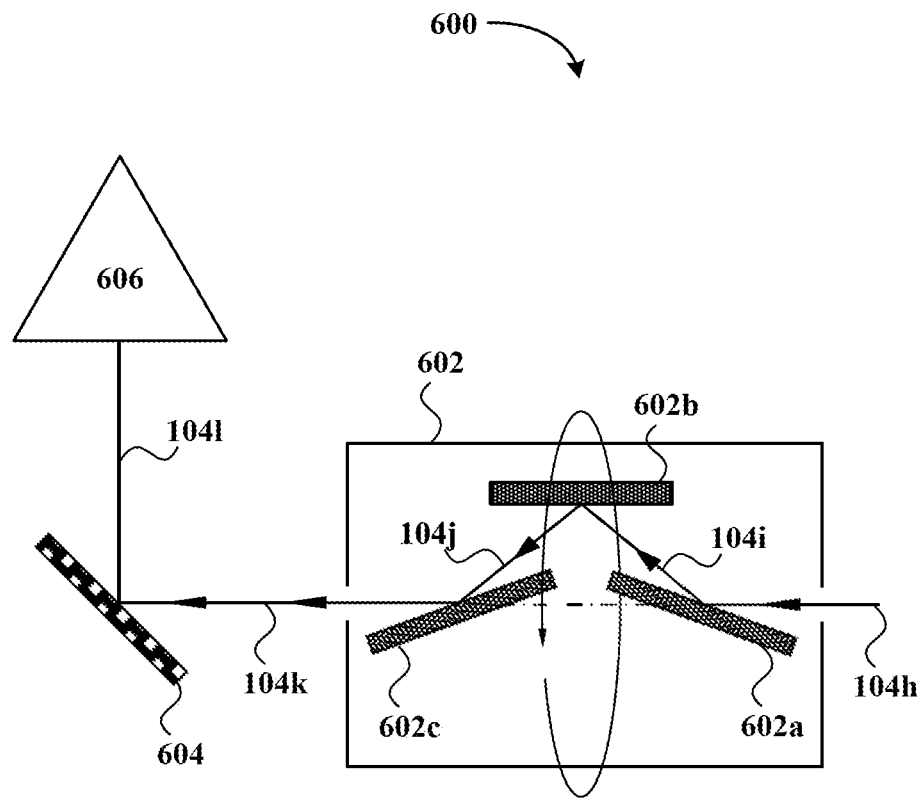
FIG. 6 illustrates a schematic representation of an alternate polarization state analyzer as used in an ellipsometer in accordance with embodiments of the present invention.

Fewer reflective elements in polarization state analyzer 108 may be used to reduce the losses incurred at each mirror reflection. In some embodiments of the present invention, polarizers 112 or 118 may be replaced with Brewster mirrors. FIG. 6 illustrates a polarization state analyzer 600 in accordance with an alternate embodiment of the present invention, which includes a compensator 602, Brewster mirror 604, and a detector 606. Compensator 602 is similar to compensator 116, as shown in FIGS. 1 and 4, and receives radiation beam 104*h* reflected from sample artifact front surface positioned on sample holder 102. All other disclosed embodiments of compensator 116 could also apply to compensator 602. Compensator 602 includes mirrors 602*a*, 602*b*, and 602*c*, as shown in FIG. 6, positioned to receive radiation beam 104*h* reflected from sample artifact 102 front surface and redirect as radiation beam 104*k* along an optical axis that aligns with the optical axis of radiation beam 104*h* after reflections from mirrors 602*a-c*, as further shown in FIG. 6. Compensator 602 is capable of rotating about an axis that aligns with the optical axes of radiation beams 104*h* and 104*k*. Radiation beam 104*k* from compensator 602 is transmitted to Brewster mirror 604 and Brewster mirror 604 reflects primarily s-polarized radiation beam 104*l* to detector 606. Brewster mirror 604 can be made from silicon, gold, platinum, and the like. Ellipsometer 100 operating at the shorter wavelengths, such as from about 10 nm to about 30 nm, may include mirrors 604 having multilayer stacks applied to optimize the reflectance.

Referring back to FIGS. 1 and 4, detector 120 is positioned along an axis that aligns with the optical axes of radiation beams 104*h*, 104*k* and 104*n*, as further shown in FIG. 1, to detect radiation beam 104*n* exiting polarizer 118. Detector 120 measures signals for N rotation angles of compensator 114 of polarization state generator 106 and M rotation angles of compensator 116 of polarization state analyzer 108. Processor 110 determines a M×N matrix corresponding to N rotation angles of compensator 114 and M rotation angles of compensator 116. Processor 110 further determines a Mueller matrix for reflection by sample artifact 102 using Equation (6) provided below. The Mueller matrix is a function of the angle of radiation beam 104*g* exiting compensator 114 and incident upon a front surface of a sample artifact positioned on sample holder 102. For anisotropic media or periodic nanostructures, the Mueller matrix is also a function of azimuthal rotation of sample artifact about its surface normal.

Optical reflection from an isotropic medium can be described by two complex-valued, wavelength-dependent coefficients $r_s$ and $r_p$ that represent the ratios of the electric field amplitudes upon reflection for s and p polarized light, respectively. Here, s polarization refers to optical radiation with an electric field perpendicular to the plane of incidence, p polarization refers to optical radiation with an electric field parallel to the plane of incidence. Coefficients $r_s$ and $r_p$ can be determined from Fresnel's equations for any incident angle $\theta$ for materials whose complex-valued indices of refraction $\tilde{n}=n+ik$ are known, where n and k are referred to as optical constants:

$$r_s = \frac{\cos\theta - (\tilde{n}^2 - \sin^2\theta)^{1/2}}{\cos\theta + (\tilde{n}^2 - \sin^2\theta)^{1/2}} \tag{1}$$

$$r_p = \frac{\tilde{n}^2 \cos\theta - (\tilde{n}^2 - \sin^2\theta)^{1/2}}{\tilde{n}^2 \cos\theta + (\tilde{n}^2 - \sin^2\theta)^{1/2}} \quad (2)$$

The square of the complex-valued index of refraction is referred to as the dielectric function. Other expressions for the coefficients $r_s$ and $r_p$ can be used when the material has multiple interfaces, such as with thin films, or when the indices are graded.

Quantities that describe optical radiation intensity can be represented polarimetrically by a Stokes vector, $$S = \begin{pmatrix} \langle |E_s|^2 \rangle + \langle |E_p|^2 \rangle \\ \langle |E_s|^2 \rangle - \langle |E_p|^2 \rangle \\ \langle 2\mathrm{Re}[E_s E_p^*] \rangle \\ \langle 2\mathrm{Im}[E_s E_p^*] \rangle \end{pmatrix} \quad (3)$$

where $E_s$ and $E_p$ represent the s and p components of the electric field, respectively. The first component represents the total intensity, the second and third components represent linear polarization, and the fourth component represents circular polarization. Reflection from a surface can be represented by a Mueller matrix, representing the linear relationship between the incoming and outgoing Stokes vectors, which for a surface having reflection coefficients $r_s$ and $r_p$ is $$M = \begin{pmatrix} \langle |r_s|^2 + |r_p|^2 \rangle/2 & \langle |r_s|^2 - |r_p|^2 \rangle/2 & 0 & 0 \\ \langle |r_s|^2 - |r_p|^2 \rangle/2 & \langle |r_s|^2 + |r_p|^2 \rangle/2 & 0 & 0 \\ 0 & 0 & \langle \mathrm{Re}(r_s r_p^*) \rangle & \langle \mathrm{Im}(r_s r_p^*) \rangle \\ 0 & 0 & -\langle \mathrm{Im}(r_s r_p^*) \rangle & \langle \mathrm{Re}(r_s r_p^*) \rangle \end{pmatrix} \quad (4)$$

For anisotropic materials and for periodic structures, the Mueller matrix has fewer elements that are zero than those shown in Equation (2). For a single interface between vacuum and a material having a complex-valued index of refraction $\tilde{n}$, the reflection coefficients are given by Equations (1) and (2) above.

Ellipsometer 100 operates by impinging a series of Stokes vectors generated by polarization state generator 106 onto the unknown sample under test and sensing the reflected light with a series of Stokes vector sensitivities analyzed by polarization state analyzer 108. The measurement matrix can be represented by $$P = AMW \quad (5)$$

where W is a 4×N matrix whose rows include the N Stokes vectors applied to the sample and A is a M×4 matrix whose columns include the M Stokes vector sensitivities. P is a M×N matrix that contains the measurements for each combination of incident and sensed polarization. The unknown sample matrix M can then be determined from $$M = A^{-1} P W^{-1} \quad (6)$$

$A^{-1}$ and $W^{-1}$ can be determined from A and W in Equation (5) provided A and W are well-conditioned. As used herein, the term "well-conditioned" refers to a matrix having a condition number not substantially larger than $\sqrt{3}$ and that the inverse of such matrix can be calculated with reasonable accuracy. The condition number is defined as the ratio of maximum singular value to the minimum singular value in a singular value decomposition and provides a metric for a Stokes polarimeter's behavior. A preferred polarimeter has a condition number of $\sqrt{3}$.

Figure 7:
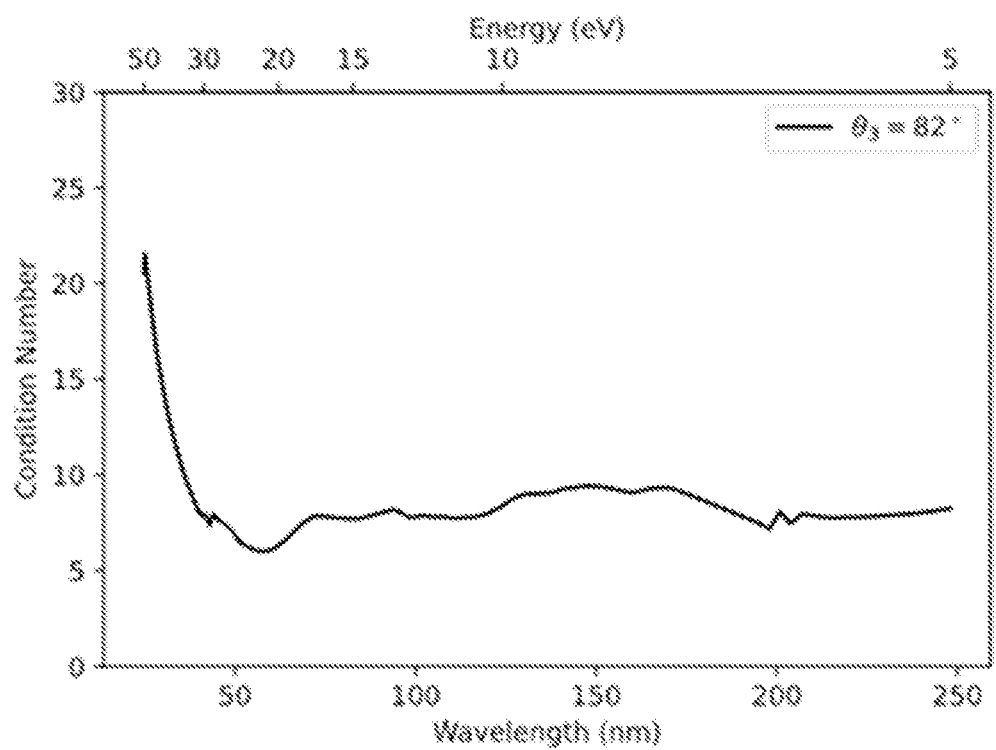
FIG. 7 illustrates an exemplary plot for calculated condition number for polarization state generator or analyzer shown in FIG. 1.

FIG. 7 shows an exemplary plot for calculated condition number for polarizer 112 shown in FIG. 1, wherein each of mirrors 112a-c and 114a-c are platinum mirrors and positioned with $\theta_1 = 67.5$ deg. (such that $\theta_2 = 45$ deg.), $\theta_3 = 82$ deg. (such that $\theta_4 = 74$ deg.), and compensator 114 is rotated from 0 deg. (where the planes of incidence of all six reflections coincide) to 157.5 deg. with increments of 22.5 deg. The condition number for this configuration of platinum mirrors is less than 10 for wavelengths longer than 36 nm. Other mirror materials, or combinations of different materials for each mirror, used with varying angles $\theta_1$ and $\theta_3$ (and thus, $\theta_2$ and $\theta_4$) can yield different condition numbers and improved condition numbers or increase the throughput of polarization state generator 106.

When unpolarized radiation beam 104a enters polarizer 112, the Stokes vector transmitting through polarizer 112 and compensator 114 and emerging as radiation beam 104g when compensator 114 is rotated an angle $\alpha$ from polarizer 112, is $R(-\alpha)M(\theta_3,\tilde{n})M(\theta_4,\tilde{n})M(\theta_3,\tilde{n})R(\alpha)M(\theta_1,\tilde{n})M(\theta_2,\tilde{n})M$
$(\theta_1,\tilde{n})S_{unpol}$ where $M(\theta, \tilde{n})$ is obtained from Equation (4) using Equations (1) and (2), and $R(\alpha)$ is the rotation matrix $$R(\alpha) = \begin{pmatrix} 1 & 0 & 0 & 0 \\ 0 & \cos 2\alpha & \sin 2\alpha & 0 \\ 0 & -\sin 2\alpha & \cos 2\alpha & 0 \\ 0 & 0 & 0 & 1 \end{pmatrix} \quad (7)$$

Figure 8:
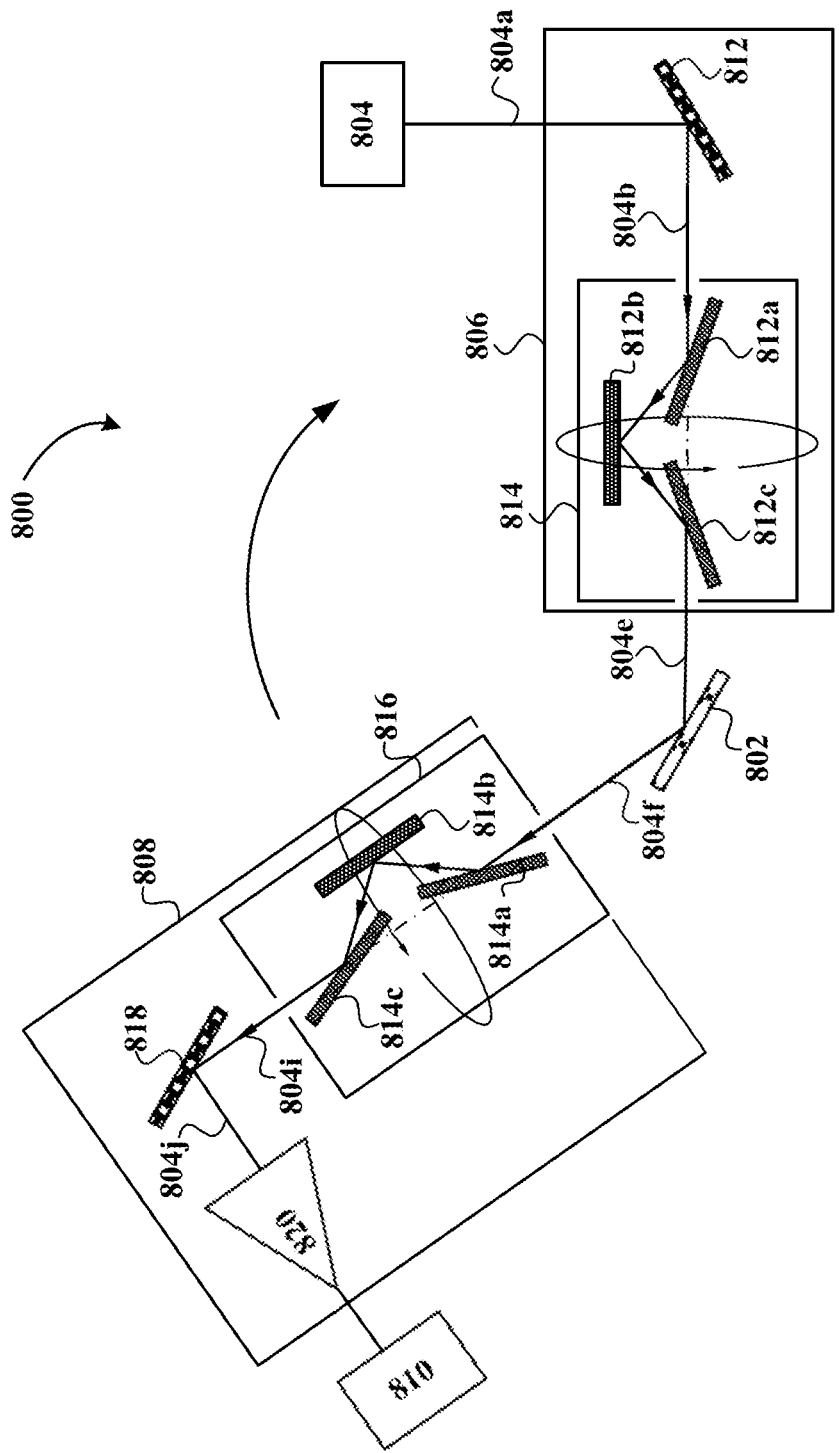
FIG. 8 illustrates a schematic representation of an alternate ellipsometer in accordance with embodiments of the present invention.

FIG. 8 shows an ellipsometer 800 in accordance with a second embodiment of the present invention. Ellipsometer for probing a sample artifact includes a sample holder 802, a radiation source 804, polarization state generator 806 and a polarization state analyzer 808 and a processor 810 arranged in a manner as shown in FIG. 8. Radiation source 804 is similar to radiation source 104, as shown in FIG. 1, which emits radiation beam 804a to polarization state generator 806. Polarization state generator 806 includes a Brewster mirror 812 and a compensator 814. Brewster mirror 812 is positioned to receive radiation beam 804a from radiation source 804 and reflect a s-polarized radiation beam 804b to compensator 814 while no p-polarized radiation beam enters and exits Brewster mirror 812.

Compensator 814 is similar to compensator 116, as shown in FIGS. 1 and 4, and receives radiation beam 804b reflected from Brewster mirror 812. All other disclosed embodiments of compensator 116 could also apply to compensator 814. Compensator 814 includes mirrors 814a, 814b, and 814c, as shown in FIG. 8, positioned to receive radiation beam 804b reflected from Brewster mirror 812 and redirect radiation beam 804e reflected from mirrors 814a-c along an optical axis that aligns with the optical axis of radiation beam 804b, as further shown in FIG. 8. Compensator 814 is capable of rotating about an axis that aligns with the optical axes of radiation beams 804b and 804e.

Radiation beam 804e exiting compensator 814 is directed to sample artifact positioned on sample holder 802. Sample holder 802 is positioned such that radiation beam 804e exiting compensator 814 is incident on a surface of sample artifact. Sample holder 802 can be rotated such that radiation beam 804e is incident on sample artifact front surface at a predetermined incident angle. In one embodiment, sample holder 802 can be rotated azimuthally about its surface normal. Radiation beam 804e incident on sample artifact front surface is reflected as radiation beam 804f into polarization state analyzer 808.

Polarization state analyzer 808 includes a compensator 816, a Brewster mirror 818 and a detector 820 and rotates about an axis passing through the location where radiation beam 804e strikes the front surface of the sample artifact positioned on sample holder 802, as further shown in FIG. 8. Compensator 816 is similar to compensator 116, as shown in FIGS. 1 and 4, and receives radiation beam 804f reflected from sample artifact front surface. All other disclosed embodiments of compensator 116 could also apply to compensator 816. Compensator 816 includes mirrors 816a, 816b, and 816c, as shown in FIG. 8, positioned to receive radiation beam 804f reflected from sample artifact front surface and redirect radiation beam 804i reflected from mirrors 816a-c along an optical axis that aligns with the optical axes of radiation beam 804f, as further shown in FIG. 8. Compensator 816 is capable of rotating about an axis that aligns with the optical axes of radiation beams 804f and 804i. Radiation beam 804i from compensator 816 is transmitted to Brewster mirror 818 and Brewster mirror 818 reflects primarily s-polarized radiation beam 804j to detector 820.

Detector 820 is similar to detector 120, and is positioned to detect s-polarized radiation beam 804j reflected by Brewster mirror 818, as further shown in FIG. 8. Detector 820 measures signals for N rotation angles of compensator 814 of polarization state generator 806 and M rotation angles of compensator 816 of polarization state analyzer 808. Processor 810 determines a M×N matrix corresponding to N rotation angles of compensator 814 and M rotation angles of compensator 816. Processor 810 further determines a Mueller matrix for reflection by sample artifact as a function of the angle radiation beam 804f exiting compensator 814 and incident upon sample artifact. For anisotropic media or periodic nanostructures, it is also a function of azimuthal rotation of sample artifact about its surface normal.

Figure 9:
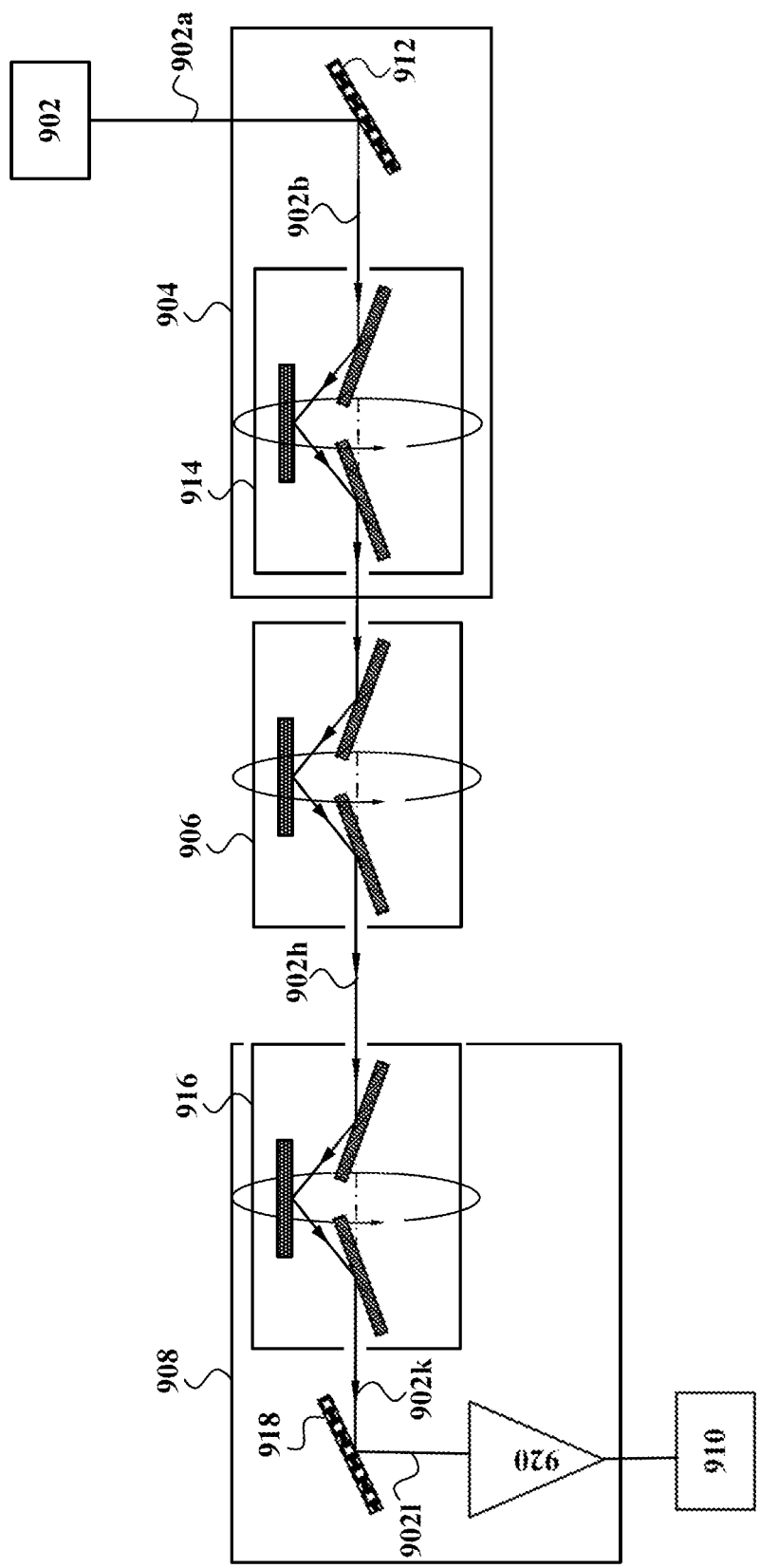
FIG. 9 illustrates a schematic representation of a calibration assembly for an ellipsometer in accordance with embodiments of the present invention.

Ellipsometers in accordance with the present invention, as shown in FIGS. 1 and 8, can be calibrated using an arrangement of optical elements as shown in FIG. 9 and eigenvalue calibration methods known in the art to obtain the matrices A and W, as shown in Equation (5), and data reduction matrices $A^{-1}$ and $W^{-1}$, as shown in Equation (6). The arrangement of optical elements shown in FIG. 9 is similar to the arrangement of optical elements shown in FIG. 8 with sample artifact and sample holder 802 removed such that polarization state analyzer 908 is positioned to directly measure radiation beam 902h transmitted by rotating compensator 914 of polarization state generator 904. An additional rotating compensator 906 is positioned between the polarization state generator 904 and polarization state analyzer 908, as shown in FIG. 9. For each of at least two rotations of compensator 906, detector 920 measures signals corresponding to N rotation angles of compensator 914 of polarization state generator 904 and M rotation angles of compensator 916 of polarization state analyzer 908. Processor 910 determines a M×N matrix corresponding to N rotation angles of compensator 914 and M rotation angles of compensator 916. The additional compensator 906 exhibits net diattenuation and retardance to yield a suitable calibration. Detector 920 further measures signals corresponding to N rotation angles of compensator 914 and M rotation angles of compensator 916 in an arrangement without including compensator 906, and processor 910 determines an additional M×N matrix corresponding to the N rotation angles of compensator 914 and the M rotation angles of compensator 916.

Figure 10:
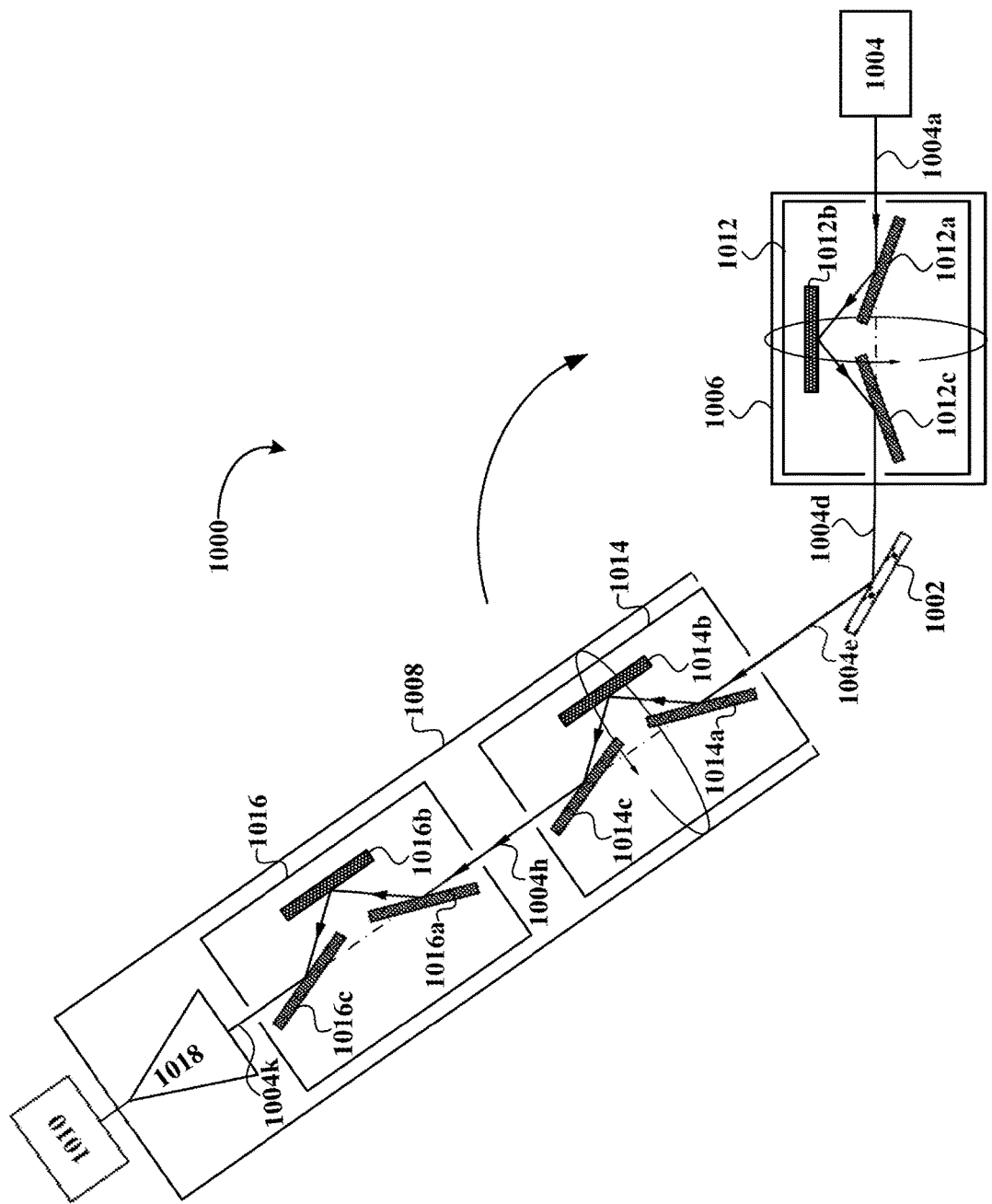
FIG. 10 illustrates a schematic representation of an alternate ellipsometer in accordance with embodiments of the present invention.

In embodiments wherein radiation beam from a radiation source is naturally polarized, a polarizer is optional in a polarization state generator for the operation of an ellipsometer in accordance with the present invention and, as shown in FIG. 10, a polarization state generator need only include a compensator and the naturally polarized radiation beam from radiation source can be transmitted directly to the compensator. FIG. 10 shows an ellipsometer 1000 in accordance with an alternate embodiment of the present invention for probing a sample artifact. Ellipsometer 1000 includes a sample holder 1002, a radiation source 1004, polarization state generator 1006, a polarization state analyzer 1008 and a processor 1010 arranged in a manner as shown in FIG. 10. Radiation source 1004 emits radiation beam 1004a that is naturally polarized to polarization state generator 1006. Polarization state generator 1006 includes a compensator 1012 positioned to receive radiation beam 1004a from radiation source 1004 and reflect a radiation beam 1004d having a phase retardance to sample artifact positioned on sample holder 1002.

Compensator 1012 is similar to compensator 116, as shown in FIGS. 1 and 4, and receives radiation beam 1004a from radiation source 1004. All other disclosed embodiments of compensator 116 could also apply to compensator 1012. Compensator 1012 includes mirrors 1012a, 1012b, and 1012c, as shown in FIG. 10, positioned to receive radiation beam 1004a from radiation source 1004 and redirect radiation beam 1004d reflected from mirrors 1012a-c along an optical axis that aligns with the optical axis of radiation beam 1004a, as further shown in Figure Compensator 1012 is capable of rotating about an axis that aligns with the optical axes of radiation beams 1004a and 1004d.

Radiation beam 1004d exiting compensator 1012 is directed to sample artifact positioned on sample holder 1002. Sample holder 1002 is positioned such that radiation beam 1004d exiting compensator 1012 is incident on a surface of sample artifact. Sample holder 1002 can be rotated such that radiation beam 1004d is incident on sample artifact front surface at a predetermined incident angle. In one embodiment, sample holder 1002 can be rotated azimuthally about its surface normal. Radiation beam 1004d incident on sample artifact front surface is reflected as radiation beam 1004e into polarization state analyzer 1008.

Polarization state analyzer 1008 includes a compensator 1014, a polarizer 1016 and a detector 1018, and rotates about an axis passing through the location where radiation beam 1004d strikes the front surface of the sample artifact positioned on sample holder 1002, as further shown in FIG. 10. Compensator 1014 is similar to compensator 116, as shown in FIGS. 1 and 4, and receives radiation beam 1004e reflected from sample artifact front surface. All other disclosed embodiments of compensator 116 could also apply to compensator 1014. Compensator 1014 includes mirrors 1014a, 1014b, and 1014c, as shown in FIG. 10, positioned to receive radiation beam 1004e reflected from sample artifact front surface and redirect radiation beam 1004h reflected from mirrors 1014a-c along an optical axis that aligns with the optical axis of radiation beam 1004e, as further shown in FIG. 10. Compensator 1014 is capable of rotating about an axis that aligns with the optical axes of radiation beams 1004e and 1004h. Radiation beam 1004h from compensator 1014 is transmitted to polarizer 1016.

Polarizer 1016 is similar to polarizer 118, and is positioned to reflect primarily s-polarized radiation beam 1004k to detector 1018.

Detector 1018 is similar to detector 120, and is positioned to detect s-polarized radiation beam 1004k reflected by polarizer 1016, as further shown in FIG. 10. Detector 1018 measures signals for N rotation angles of compensator 1012 of polarization state generator 1006 and M rotation angles of compensator 1014 of polarization state analyzer 1008. Processor 1010 determines a M×N matrix corresponding to N rotation angles of compensator 1012 and M rotation angles of compensator 1014. Processor 1010 further determines a Mueller matrix for reflection by sample artifact as a function of the angle radiation beam 1004d exiting compensator 1012 and incident upon sample artifact. For anisotropic media or periodic nanostructures, it is also a function of azimuthal rotation of sample artifact about its surface normal.

It should be understood that arrangement of optical elements in ellipsometers, as shown herein, are not exhaustive and that other optical elements can be utilized as well before, after, or between any of the illustrated optical elements.

Ellipsometers in accordance with embodiments of the present invention can operate at VUV and EUV wavelengths and enable measurements of the Mueller matrix associated with the reflection of radiation in VUV and EUV wavelengths, which can be used to determine optical constants of materials, the thickness and optical constants of thin films, and the dimensions (such as height, width, side wall angle) of periodic microstructures. Ellipsometers in accordance with embodiments of the present invention has several advantages over previous ellipsometers. Scatterometry, or the use of spectroscopic ellipsometry for the measurement of the dimensions of nanopatterned structures, is a critical process control technology used by the semiconductor industry. Ellipsometers in accordance with embodiments of the present invention provide paths toward implementing scatterometry in wavelengths shorter than about 150 nm, and in particular, in the deep ultraviolet or extreme ultraviolet spectral regions. Ellipsometers in accordance with embodiments of the present invention can be used to characterize high-quality multilayer optical systems to provide complete knowledge of the polarization properties, such as the change in phase at the interfaces of a multilayer, which is necessary for the optical imaging in EUV-lithography and currently is simulated from coating models. Mueller matrix formalism can describe reflection from disordered materials, such as patterns with roughness that cause depolarization. As industrial processes become more complex, ellipsometers in accordance with embodiments of the present invention operating at VUV or EUV wavelengths can be used to improve the characterization of nanostructured materials with roughness.

Ellipsometers in accordance with one or more embodiments of the present invention can be adapted to a variety of configurations. It is thought that ellipsometers in accordance with various embodiments of the present invention and many of its attendant advantages will be understood from the foregoing description and it will be apparent that various changes may be made without departing from the spirit and scope of the invention or sacrificing all of its material advantages, the form hereinbefore described being merely a preferred or exemplary embodiment thereof.

Those familiar with the art will understand that embodiments of the invention may be employed, for various specific purposes, without departing from the essential substance thereof. The description of any one embodiment given above is intended to illustrate an example rather than to limit the invention. This above description is not intended to indicate that any one embodiment is necessarily preferred over any other one for all purposes, or to limit the scope of the invention by describing any such embodiment, which invention scope is intended to be determined by the claims, properly construed, including all subject matter encompassed by the doctrine of equivalents as properly applied to the claims.

What is claimed is:

1. An ellipsometer for investigating a sample, said ellipsometer comprising:
   a radiation source for generating a non-polarized radiation beam;
   a polarization state generator comprising:
      a first polarizer comprising a first plurality of mirrors positioned to modify the non-polarized radiation beam to a first polarized radiation beam, wherein an optical axis of the first polarized radiation beam is substantially aligned with an optical axis of the non-polarized radiation beam; and
      a first rotating compensator comprising a second plurality of mirrors for altering the first polarized radiation beam to a second polarized radiation beam having a first phase retardance, wherein an optical axis of the second polarized radiation beam is substantially aligned with the optical axis of the first polarized radiation beam;
   a sample holder for positioning a first surface of the sample to receive the second polarized radiation beam from the first rotating compensator, wherein the first surface of the sample reflects a third polarized radiation beam;
   a polarization state analyzer comprising:
      a second rotating compensator comprising a third plurality of mirrors for altering the third polarized radiation beam to a fourth polarized radiation beam having a second phase retardance, wherein an optical axis of the fourth polarized radiation beam is substantially aligned with the optical axis of the third polarized radiation beam; and
      a second polarizer comprising a fourth plurality of mirrors for modifying the fourth polarized radiation beam to a fifth polarized radiation beam, wherein an optical axis of the fifth polarized radiation beam is substantially aligned with an optical axis of the fourth polarized radiation beam;
   a detector for measuring a plurality of first signals for a plurality of first rotation angles of the first rotating compensator and a plurality of second signals for a plurality of second rotation angles of the second rotating compensator; and
   a processor for determining a Mueller matrix from the plurality of the first rotation angles of the first rotating compensator and the plurality of the second rotation angles of the second rotating compensator.

2. The ellipsometer of claim 1, wherein the non-polarized radiation beam has a wavelength in vacuum ultraviolet region of an electromagnetic spectrum.

3. The ellipsometer of claim 1, wherein the non-polarized radiation beam has a wavelength in extreme ultraviolet region of an electromagnetic spectrum.

4. The ellipsometer of claim 1, wherein at least one of the first polarizer, the second polarizer, the first compensator and the second compensator comprise three mirrors.

5. The ellipsometer of claim 1, wherein at least one of the first polarizer, the second polarizer, the first compensator and the second compensator comprise four mirrors.

6. The ellipsometer of claim 1, wherein the first plurality of mirrors comprise:
- a first mirror positioned to reflect the non-polarized radiation beam incident on the first mirror as a first reflected radiation beam;
- a second mirror positioned to reflect the first reflected radiation beam incident on the second mirror as a second reflected radiation beam; and
- a third mirror positioned to reflect the second reflected radiation beam incident on the third mirror as the first polarized radiation beam;

wherein the second plurality of mirrors comprise:
- a fourth mirror positioned to reflect the first polarized radiation beam incident on the fourth mirror as a third reflected radiation beam;
- a fifth mirror positioned to reflect the third reflected radiation beam incident on the fifth mirror as a fourth reflected radiation beam; and
- a sixth mirror positioned to reflect the fourth reflected radiation beam incident on the sixth mirror as the second polarized radiation beam having the first phase retardance;

wherein the third plurality of mirrors comprise:
- a seventh mirror positioned to reflect the third polarized radiation beam incident on the seventh mirror as fifth reflected radiation beam;
- an eighth mirror positioned to reflect the fifth reflected radiation beam incident on the eighth mirror as a sixth reflected radiation beam; and
- a ninth mirror positioned to reflect the sixth reflected radiation beam incident on the ninth mirror as the fourth polarized radiation beam having the second phase retardance; and wherein the fourth plurality of mirrors comprise:
- a tenth mirror positioned to reflect the fourth polarized radiation beam incident on the tenth mirror as a seventh reflected radiation beam;
- an eleventh mirror positioned to reflect the seventh reflected radiation beam incident on the eleventh mirror as an eighth reflected radiation beam; and
- a twelfth mirror positioned to reflect the eighth reflected radiation beam incident on the twelfth mirror as the fourth polarized radiation beam.

7. The ellipsometer of claim 6, wherein the first plurality of mirrors further comprises a thirteenth mirror positioned to receive one of the non-polarized radiation beam, the first reflected radiation beam and the second reflected radiation beam, wherein the first, the second, the third and the thirteenth mirrors modify the non-polarized radiation beam to the first polarized radiation beam.

8. The ellipsometer of claim 6 or 7, wherein the second plurality of mirrors further comprises a fourteenth mirror positioned to receive one of the first polarized radiation beam, the third reflected radiation beam and the fourth reflected radiation beam, wherein the fourth, the fifth, the sixth and the fourteenth mirrors alter the first polarized radiation beam to the second polarized radiation beam having the first phase retardance.

9. The ellipsometer of claim 6 or 7, wherein the third plurality of mirrors further comprises a fourteenth mirror positioned to receive one of the third polarized radiation beam, the fifth reflected radiation beam and the sixth reflected radiation beam, wherein the seventh, the eighth, the ninth and the fourteenth mirrors alter the third polarized radiation beam to the fourth polarized radiation beam having the second phase retardance.

10. The ellipsometer of claim 6 or 7, wherein the fourth plurality of mirrors further comprises a fourteenth mirror positioned to receive one of the fourth polarized radiation beam, the seventh reflected radiation beam and the eighth reflected radiation beam, wherein the tenth, the eleventh, the twelfth and the fourteenth mirrors modify the fourth polarized radiation beam to the fifth polarized radiation beam.

11. The ellipsometer of claim 1, wherein the first rotating compensator is rotated about an axis substantially aligned with the optical axes of the first and the second polarized radiation beams, and wherein the second compensator is rotated about an axis substantially aligned with the optical axes of the third and the fourth polarized radiation beams.

12. The ellipsometer of claim 1, wherein the polarization state analyzer is rotated about an axis passing through a location the second polarized radiation beam is received on the first surface of the sample positioned on the sample holder, wherein the sample holder rotates the sample about the axis passing through the location the second polarized radiation beam is received on the first surface of the sample positioned on the sample holder, wherein the rotation of the sample is about one-half of the rotation of the polarization state analyzer, and wherein the rotating the polarization state analyzer adjusts an angle of incidence of the second polarized radiation beam on the first surface of the sample positioned on the sample holder and an angle of reflection of the third polarized radiation beam.

13. The ellipsometer of claim 1, wherein the sample holder rotates the sample in an azimuthal direction about an axis normal to the first surface of the sample.

14. An ellipsometer for investigating a sample, said ellipsometer comprising:
- a radiation source for generating a non-polarized radiation beam having a wavelength from about 10 nm to about 240 nm;
- a first polarizer for modifying the non-polarized radiation beam to a first polarized radiation beam, wherein an optical axis of the first polarized radiation beam is substantially aligned with an optical axis of the non-polarized radiation beam, wherein the first polarizer comprises:
  - a first mirror positioned to reflect the non-polarized radiation beam incident on the first mirror as a first reflected radiation beam;
  - a second mirror positioned to reflect the first reflected radiation beam incident on the second mirror as a second reflected radiation beam; and
  - a third mirror positioned to reflect the second reflected radiation beam incident on the third mirror as the first polarized radiation beam;
- a first rotating compensator for altering the first polarized radiation beam to a second polarized radiation beam having a first phase retardance, wherein an optical axis of the second polarized radiation beam is substantially aligned with the optical axis of the first polarized radiation beam, wherein the first compensator is rotated about an axis substantially aligned with the optical axes of the first and the second polarized radiation beams, wherein the first rotating compensator comprises:
  - a fourth mirror positioned to reflect the first polarized radiation beam incident on the fourth mirror as a third reflected radiation beam, wherein the third reflected radiation beam comprises a second phase retardance;
  - a fifth mirror positioned to reflect the third reflected radiation beam incident on the fifth mirror as a fourth reflected radiation beam, wherein the fourth reflected radiation beam comprises a third phase retardance; and a sixth mirror positioned to reflect the fourth reflected radiation beam incident on the sixth mirror as the second polarized radiation beam having the first phase retardance;

a sample holder for positioning a first surface of the sample to receive the second polarized radiation beam from the first rotating compensator, wherein the first surface of the sample reflects a third polarized radiation beam;

a second rotating compensator for altering the third polarized radiation beam to a fourth polarized radiation beam having a fourth phase retardance, wherein an optical axis of the fourth polarized radiation beam is substantially aligned with the optical axis of the third polarized radiation beam, wherein the second compensator is rotated about an axis substantially aligned with the optical axes of the third and the fourth polarized radiation beams, wherein the second compensator comprises:

a seventh mirror positioned to reflect the third polarized radiation beam incident on the seventh mirror as a fifth reflected radiation beam, wherein the fifth reflected radiation beam comprises a fifth phase retardance;

an eighth mirror positioned to reflect the fifth reflected radiation beam incident on the eighth mirror as a sixth reflected radiation beam, wherein the sixth reflected beam comprises a sixth phase retardance; and a ninth mirror positioned to reflect the sixth reflected radiation beam incident on the ninth mirror as the fourth polarized radiation beam having the fourth phase retardance;

a second polarizer for modifying the fourth polarized radiation beam to a fifth polarized radiation beam, wherein an optical axis of the fifth polarized radiation beam is substantially aligned with an optical axis of the fourth polarized radiation beam, wherein the second polarizer comprises:

a tenth mirror positioned to reflect the fourth polarized radiation beam incident on the tenth mirror as a seventh reflected radiation beam;

an eleventh mirror positioned to reflect the seventh reflected radiation beam incident on the eleventh mirror as an eighth reflected radiation beam; and a twelfth mirror positioned to reflect the eighth reflected radiation beam incident on the twelfth mirror as the fifth polarized radiation beam;

a detector for measuring a plurality of first signals for a plurality of first rotation angles of the first rotating compensator and a plurality of second signals for a plurality of second rotation angles of the second rotating compensator; and a processor for determining a Mueller matrix from the plurality of the first rotation angles of the first rotating compensator and the plurality of the second rotation angles of the second rotating compensator.

15. The ellipsometer of claim 14, wherein the wavelength of the non-polarized radiation beam is from about 10 nm to about 30 nm.

16. The ellipsometer of claim 14, wherein the wavelength of the non-polarized radiation beam is from about 30 nm to about 240 nm.

17. The ellipsometer of claim 14, wherein the second compensator and the second polarizer are rotated about an axis passing through a location the second polarized radiation beam is received on the first surface of the sample positioned on the sample holder, wherein the sample holder rotates the sample about the axis passing through the location the second polarized radiation beam is received on the first surface of the sample positioned on the sample holder, wherein the rotation of the sample is about one-half of the rotation of the polarization state analyzer, and wherein the rotating the polarization state analyzer adjusts an angle of incidence of the second polarized radiation beam on the first surface of the sample positioned on the sample holder and an angle of reflection of the third polarized radiation beam.

18. The ellipsometer of claim 14, wherein the sample holder rotates the sample in an azimuthal direction about an axis normal to the first surface of the sample.

19. The ellipsometer of claim 14, wherein the first polarizer further comprises a thirteenth mirror positioned to receive one of the non-polarized radiation beam, the first reflected radiation beam and the second reflected radiation beam, and wherein the first, the second, the third and the thirteenth mirrors are positioned to modify the non-polarized radiation beam to the first polarized radiation beam.

20. The ellipsometer of claim 14, wherein the second polarizer further comprises a thirteenth mirror positioned to receive one of the fourth polarized radiation beam, the seventh reflected radiation beam and the eighth reflected radiation beam, and wherein the tenth, the eleventh, the twelfth and the thirteenth mirrors are positioned to modify the fourth polarized radiation beam to the fifth polarized radiation beam.

21. The ellipsometer of claim 14, wherein the first polarizer further comprises a thirteenth mirror positioned to receive a ninth reflected radiation beam from the third mirror, and wherein the thirteenth mirror is positioned to reflect the ninth reflected radiation beam incident on the thirteenth mirror as the first polarized radiation beam, and wherein the second polarizer further comprises a fourteenth mirror positioned to receive a tenth reflected radiation beam from the twelfth mirror, and wherein the fourteenth mirror is positioned to reflect the tenth reflected radiation beam incident on the fourteenth mirror as the fifth polarized radiation beam.

22. An ellipsometer for investigating a sample, said ellipsometer comprising:

a radiation source for generating a non-polarized radiation beam;

a polarization state generator for modifying the non-polarized radiation beam to a first polarized radiation beam having a first phase retardance, wherein the polarization state generator comprises:

a first mirror positioned to reflect the non-polarized radiation beam incident on the first mirror as a first reflected radiation beam;

a second mirror positioned to reflect the first reflected radiation beam incident on the second mirror as a second reflected radiation beam;

a third mirror positioned to reflect the second reflected radiation beam incident on the second mirror as a third reflected radiation beam;

a fourth mirror positioned to reflect the third reflected radiation beam incident on the third mirror as a fourth reflected radiation beam; and a first rotating compensator for altering the fourth reflected radiation beam to the first polarized radiation beam having the first phase retardance, wherein an optical axis of the first polarized radiation beam is substantially aligned with the optical axis of the non-polarized radiation beam, wherein the first compensator is rotated about an axis substantially aligned with the optical axis of the first polarized radiation beam;

a sample holder for positioning a first surface of the sample to receive the first polarized radiation beam from the polarization state generator, wherein the first surface of the sample reflects a second polarized radiation;

a polarization analyzer comprising:
a second rotating compensator for altering the second polarized radiation beam to a third polarized radiation beam having a second phase retardance, wherein an optical axis of the third polarized radiation beam is substantially aligned with the optical axis of the second polarized radiation beam, wherein the compensator is rotated about an axis substantially aligned with the optical axes of the second and the third polarized radiation beams; and a polarizer for modifying the third polarized radiation beam to a fourth polarized radiation beam, wherein an optical axis of the fourth polarized radiation beam is substantially aligned with an optical axis of the third polarized radiation beam;

a detector for measuring a plurality of first signals for a plurality of first rotation angles of the polarization state generator and a plurality of second signals for a plurality of second rotation angles of the rotating compensator; and a processor for determining a Mueller matrix from the plurality of the first rotation angles of the polarization state generator and the plurality of the second rotation angles of the rotating compensator.

23. The ellipsometer of claim 22, wherein the non-polarized radiation beam has a wavelength in vacuum ultraviolet region of an electromagnetic spectrum.

24. The ellipsometer of claim 22, wherein the non-polarized radiation beam has a wavelength in extreme ultraviolet region of an electromagnetic spectrum.

25. The ellipsometer of claim 22, wherein the first rotating compensator comprises:
a fifth mirror positioned to reflect the fourth reflected radiation beam incident on the fifth mirror as a fifth reflected radiation beam, wherein the fifth reflected radiation beam comprises a third phase retardance;
a sixth mirror positioned to reflect the fifth reflected radiation beam incident on the sixth mirror as a sixth reflected radiation beam, wherein the fifth reflected beam comprises a fourth phase retardance; and
a seventh mirror positioned to reflect the sixth reflected radiation beam incident on the seventh mirror as the first polarized radiation beam having the first phase retardance.

26. The ellipsometer of claim 22, wherein the second rotating compensator comprises:
a fifth mirror positioned to reflect the second polarized radiation beam incident on the fifth mirror as a fifth reflected radiation beam, wherein the fifth reflected radiation beam comprises a third phase retardance;
a sixth mirror positioned to reflect the fifth reflected radiation beam incident on the sixth mirror as a sixth reflected radiation beam, wherein the sixth reflected beam comprises a fourth phase retardance; and
a seventh mirror positioned to reflect the sixth reflected radiation beam incident on the seventh mirror as the third polarized radiation beam having the second phase retardance.

27. The ellipsometer of claim 22, wherein the polarizer comprises:
a fifth mirror positioned to reflect the third polarized radiation beam incident on the fifth mirror as a fifth reflected radiation beam;
a sixth mirror positioned to reflect the fifth reflected radiation beam incident on the sixth mirror as a sixth reflected radiation beam; and
a seventh mirror positioned to reflect the sixth reflected radiation beam incident on the seventh mirror as the fourth polarized radiation beam.

28. The ellipsometer of claim 22, wherein the polarizer comprises:
a fifth mirror positioned to reflect the third polarized radiation beam incident on the fifth mirror as a fifth reflected radiation beam;
a sixth mirror positioned to reflect the fifth reflected radiation beam incident on the sixth mirror as a sixth reflected radiation beam; and
a seventh mirror positioned to reflect the sixth reflected radiation beam incident on the seventh mirror as a seventh reflected radiation beam; and
an eighth mirror positioned to receive the seventh reflected radiation beam incident on the eighth mirror as the fourth polarized radiation beam.

29. The ellipsometer of claim 22, wherein the polarization state analyzer is rotated about an axis passing through a location the second polarized radiation beam is received on the first surface of the sample positioned on the sample holder, wherein the sample holder rotates the sample about the axis passing through the location the second polarized radiation beam is received on the first surface of the sample positioned on the sample holder, wherein the rotation of the sample is about one-half of the rotation of the polarization state analyzer, and wherein the rotating the polarization state analyzer adjusts an angle of incidence of the second polarized radiation beam on the first surface of the sample positioned on the sample holder and an angle of reflection of the third polarized radiation beam.

30. The ellipsometer of claim 22, wherein the sample holder rotates the sample in an azimuthal direction about an axis normal to the first surface of the sample.

31. An ellipsometer for investigating a sample, said ellipsometer comprising:
a radiation source for generating a non-polarized radiation beam;
a polarization state generator comprising:
a first Brewster mirror for modifying the non-polarized radiation beam to a first polarized radiation beam, wherein the first polarized radiation beam comprises a first parallel optical component and a first orthogonal optical component;
a first rotating compensator comprising a first plurality of mirrors for altering the first polarized radiation beam to a second polarized radiation beam having a first phase retardance, wherein an optical axis of the second polarized radiation beam is substantially aligned with an optical axis of the first polarized radiation beam, wherein the first rotating compensator is rotated about an axis substantially aligned with the optical axes of the first and the second polarized radiation beams;

a sample holder for positioning a first surface of the sample to receive the second polarized radiation beam from the first rotating compensator, wherein the first surface of the sample reflects a third polarized radiation beam;

a polarization analyzer comprising:

a second rotating compensator comprising a second plurality of mirrors for altering the third polarized radiation beam to a fourth polarized radiation beam having a second phase retardance, wherein an optical axis of the fourth polarized radiation beam is substantially aligned with an optical axis of the third polarized radiation beam, wherein the second compensator is rotated about an axis substantially aligned with the optical axes of the third and the fourth polarized radiation beams; and a second Brewster mirror for modifying the fourth polarized radiation beam to a fifth polarized radiation beam, wherein the fifth polarized radiation beam comprises a second parallel optical component and a second orthogonal optical component, wherein an optical axis of the fifth polarized radiation beam is substantially aligned with the optical axis of the fourth polarized radiation beam, wherein the polarization state analyzer is rotated about an axis passing through a location the second polarized radiation beam is received on the first surface of the sample positioned on the sample holder, wherein the sample holder rotates the sample about the axis passing through the location the second polarized radiation beam is received on the first surface of the sample positioned on the sample holder, wherein the rotation of the sample is about one-half of the rotation of the polarization state analyzer, and wherein the rotating the polarization state analyzer adjusts an angle of incidence of the second polarized radiation beam on the first surface of the sample positioned on the sample holder and an angle of reflection of the third polarized radiation beam;

a detector for measuring a plurality of first signals for a plurality of first rotation angles of the first rotating compensator and a plurality of second signals for a plurality of second rotation angles of the second rotating compensator; and a processor for determining a Mueller matrix from the plurality of the first rotation angles of the first rotating compensator and the plurality of the second rotation angles of the second rotating compensator.

32. The ellipsometer of claim 31, wherein the non-polarized radiation beam has a wavelength in vacuum ultraviolet region of an electromagnetic spectrum.

33. The ellipsometer of claim 31, wherein the non-polarized radiation beam has a wavelength in extreme ultraviolet region of an electromagnetic spectrum.

34. The ellipsometer of claim 31, wherein the first plurality of mirrors comprises:

a first mirror positioned to reflect the non-polarized radiation beam incident on the first mirror as a first reflected radiation beam;

a second mirror positioned to reflect the first reflected radiation beam incident on the second mirror as a second reflected radiation beam; and a third mirror positioned to reflect the second reflected radiation beam incident on the third mirror as the first polarized radiation beam having the first phase retardance.

35. The ellipsometer of claim 34, wherein the second plurality of mirrors comprises:

a fourth mirror positioned to reflect the first polarized radiation beam incident on the fourth mirror as a third reflected radiation beam;

a fifth mirror positioned to reflect the third reflected radiation beam incident on the fifth mirror as a fourth reflected radiation beam; and a sixth mirror positioned to reflect the fourth reflected radiation beam incident on the sixth mirror as the second polarized radiation beam having the second phase retardance.

36. An ellipsometer for investigating a sample, said ellipsometer comprising:

a radiation source for generating a first polarized radiation beam having a wavelength from about 10 nm to about 240 nm in an electromagnetic spectrum;

a first rotating compensator for altering the first polarized radiation beam to a second polarized radiation beam, wherein an optical axis of the second polarized radiation beam is substantially aligned with the optical axis of the first polarized radiation beam, wherein the first compensator is rotated about an axis substantially aligned with the optical axes of the first and the second polarized radiation beams, wherein the first rotating compensator comprises:

a first mirror positioned to reflect the first polarized radiation beam incident on the first mirror as a first reflected radiation beam, wherein the first reflected radiation beam comprises a first phase retardance;

a second mirror positioned to reflect the first reflected radiation beam incident on the second mirror as a second reflected radiation beam, wherein the second reflected radiation beam comprises a second phase retardance; and a third mirror positioned to reflect the second reflected radiation beam incident on the sixth mirror as the second polarized radiation beam having a third phase retardance;

a sample holder for positioning a first surface of the sample to receive the second polarized radiation beam from the first rotating compensator, wherein the first surface of the sample reflects a third polarized radiation beam;

a second rotating compensator for altering the third polarized radiation beam to a fourth polarized radiation beam, wherein an optical axis of the fourth polarized radiation beam is substantially aligned with the optical axis of the third polarized radiation beam, wherein the second compensator is rotated about an axis substantially aligned with the optical axes of the third and the fourth polarized radiation beams, wherein the second compensator comprises:

a fourth mirror positioned to reflect the third polarized radiation beam incident on the fourth mirror as a third reflected radiation beam, wherein the third reflected radiation beam comprises a fourth phase retardance;

a fifth mirror positioned to reflect the third reflected radiation beam incident on the fifth mirror as a fourth reflected radiation beam, wherein the fourth reflected beam comprises a fifth phase retardance; and a sixth mirror positioned to reflect the fourth reflected radiation beam incident on the sixth mirror as the fourth polarized radiation beam having a sixth phase retardance;

a polarizer for modifying the fourth polarized radiation beam to a fifth polarized radiation beam, wherein an optical axis of the fifth polarized radiation beam is substantially aligned with an optical axis of the fourth polarized radiation beam, wherein the second polarizer comprises:
  a seventh mirror positioned to reflect the fourth polarized radiation beam incident on the seventh mirror as a fifth reflected radiation beam;
  an eighth mirror positioned to reflect the fifth reflected radiation beam incident on the eighth mirror as a sixth reflected radiation beam; and
  a ninth mirror positioned to reflect the sixth reflected radiation beam incident on the ninth mirror as the fifth polarized radiation beam;
a detector for measuring a plurality of first signals for a plurality of first rotation angles of the first rotating compensator and a plurality of second signals for a plurality of second rotation angles of the second rotating compensator; and
a processor for determining a Mueller matrix from the plurality of the first rotation angles of the first rotating compensator and the plurality of the second rotation angles of the second rotating compensator.

37. The ellipsometer of claim 36, wherein the wavelength of the non-polarized radiation beam is from about 10 nm to about 30 nm.

38. The ellipsometer of claim 36, wherein the wavelength of the non-polarized radiation beam is from about 30 nm to about 240 nm.

39. The ellipsometer of claim 36, wherein the second compensator and the polarizer are rotated about an axis passing through a location the second polarized radiation beam is received on the first surface of the sample positioned on the sample holder, wherein the sample holder rotates the sample about the axis passing through the location the second polarized radiation beam is received on the first surface of the sample positioned on the sample holder, wherein the rotation of the sample is about one-half of the rotation of the polarization state analyzer, and wherein the rotating the polarization state analyzer adjusts an angle of incidence of the second polarized radiation beam on the first surface of the sample positioned on the sample holder and an angle of reflection of the third polarized radiation beam.

40. The ellipsometer of claim 36, wherein the sample holder rotates the sample in an azimuthal direction about an axis normal to the first surface of the sample.

41. The ellipsometer of claim 36, wherein the polarizer further comprises a tenth mirror positioned to receive a seventh reflected radiation beam from the ninth mirror, and wherein the tenth mirror is positioned to reflect the seventh reflected radiation beam incident on the tenth mirror as the fifth polarized radiation beam.

* * * * *